(12) United States Patent
Pal et al.

(10) Patent No.: US 9,156,114 B2
(45) Date of Patent: *Oct. 13, 2015

(54) METHOD FOR MANUFACTURING TURBINE NOZZLE HAVING NON-LINEAR COOLING CONDUIT

(71) Applicant: General Electric Company, Schenectady, NY (US)

(72) Inventors: Dipankar Pal, Greenville, SC (US); Benjamin Paul Lacy, Greer, SC (US)

(73) Assignee: General Electric Company, Schenectady, NY (US)

( * ) Notice: Subject to any disclaimer, the term of this patent is extended or adjusted under 35 U.S.C. 154(b) by 270 days.

This patent is subject to a terminal disclaimer.

(21) Appl. No.: 13/675,293

(22) Filed: Nov. 13, 2012

(65) Prior Publication Data

US 2014/0130354 A1  May 15, 2014

(51) Int. Cl.
*F01D 5/18* (2006.01)
*B23P 15/02* (2006.01)
(Continued)

(52) U.S. Cl.
CPC . *B23P 15/02* (2013.01); *B23H 9/10* (2013.01); *B23H 9/14* (2013.01); *F01D 5/186* (2013.01); *F01D 5/187* (2013.01); *Y10T 29/4932* (2015.01); *Y10T 29/49323* (2015.01); *Y10T 408/03* (2015.01)

(58) Field of Classification Search
CPC ............... B21J 5/00; B21K 5/04; B23K 9/14; B23K 9/10; F01D 5/08–5/088; F01D 5/18–5/189; F01D 9/06–9/065; F01D 25/12; F01D 9/041; F01D 5/143

USPC ............... 29/889.2, 889.22, 889.72, 889.721, 29/889.722; 415/115; 416/193 A, 96 R, 416/97 R

See application file for complete search history.

(56) References Cited

U.S. PATENT DOCUMENTS 5,340,278 A  8/1994  Magowan
6,382,908 B1  5/2002  Keith et al.
(Continued)

FOREIGN PATENT DOCUMENTS

EP  0416542 A1  3/1991
EP  1211384 A2  6/2002
EP  2666965 A1  11/2013

OTHER PUBLICATIONS

European Search Report and Opinion issued in connection with related EP Application No. 13192209.8 on Feb. 28, 2014.

(Continued)

*Primary Examiner* — David Bryant
*Assistant Examiner* — Jun Yoo
(74) *Attorney, Agent, or Firm* — Ernest G. Cusick; Hoffman Warnick LLC

(57) ABSTRACT

A method for manufacturing a turbine nozzle having a non-linear cooling conduit is disclosed. In one embodiment, a method includes: providing a turbine nozzle. The turbine nozzle includes: an airfoil, a cavity, having an inner surface, located within the airfoil, at least one endwall adjacent the airfoil, and a fillet region connecting the airfoil and the endwall. The fillet region also includes an outer surface. The method also includes: forming a non-linear cooling conduit within the fillet region and adjacent the outer surface of the fillet region of the turbine nozzle. The forming of the non-linear cooling conduit includes curved drilling through a portion of the outer surface of the fillet region of the turbine nozzle.

8 Claims, 26 Drawing Sheets

(51) Int. Cl.
*B23H 9/10* (2006.01)
*B23H 9/14* (2006.01)

(56) References Cited

U.S. PATENT DOCUMENTS

| | | | |
|---|---|---|---|
| 6,644,920 | B2 | 11/2003 | Beeck et al. |
| 6,830,432 | B1 | 12/2004 | Scott et al. |
| 7,097,417 | B2 * | 8/2006 | Liang .......................... 415/115 |
| 7,775,769 | B1 | 8/2010 | Liang |
| 7,927,073 | B2 * | 4/2011 | Scott et al. ................. 416/97 R |
| 2008/0085190 | A1 | 4/2008 | Liang |
| 2008/0279695 | A1 * | 11/2008 | Abdel-Messeh et al. ... 416/97 R |
| 2011/0143162 | A1 | 6/2011 | Merrill et al. |
| 2011/0217179 | A1 | 9/2011 | Wiebe |
| 2011/0223005 | A1 | 9/2011 | Lee et al. |
| 2012/0087803 | A1 * | 4/2012 | Butler et al. ................ 416/97 R |
| 2013/0312941 | A1 | 11/2013 | Bunker |

OTHER PUBLICATIONS

Mikus, Office Action Communication for U.S. Appl. No. 13/675,281 dated Jul. 20, 2015, 19 pages.

\* cited by examiner

METHOD FOR MANUFACTURING TURBINE NOZZLE HAVING NON-LINEAR COOLING CONDUIT

CROSS-REFERENCE TO RELATED APPLICATION

The current application is related to U.S. patent application Ser. No. 13/675,281, titled "TURBINE NOZZLE HAVING NON-LINEAR COOLING CONDUIT," filed on Nov. 13, 2012.

BACKGROUND OF THE INVENTION

1. Technical Field

The subject matter disclosed herein relates to turbine systems. Specifically, the subject matter disclosed herein relates to methods for manufacturing turbine nozzles having a non-linear cooling conduit.

2. Related Art

Conventional combustion turbine systems typically include a compressor device for compressing inlet air and sending the compressed air to a combustor device, which mixes the compressed air with fuel. Once the compressed air is mixed with fuel, the air-fuel mixture is ignited to generate a hot gas flow, which can be provided to a turbine device to perform mechanical work. The turbine device generates power by passing the hot gas over a plurality of stator vanes and rotating blades of the turbine device. The stationary vanes and rotating blades can aid in power generation by directing the hot gas flow through the turbine device. In the art, the stator vanes are often referred to as static airfoils, while the rotating blades are typically called buckets.

The efficiency of a conventional turbine system can be increased by increasing the temperature of the hot gas flow that passes through the turbine device. However, the ability to increase the temperature of the hot gas flow is limited by the ability of the stator vanes and the rotating blades to withstand the high temperature of the hot gas flow. More specifically, the fillet region (e.g., geometric transition zone between an airfoil and an endwall) of the vanes/blades is typically the first portion to suffer from mechanical failure when increasing the temperature of the hot gas flow within the turbine device. Conventionally, cooling features are utilized by the vanes/blades. More specifically, conventional turbine vanes/blades include a plurality of cooling holes drilled directly into the fillet region or the airfoil portion of the vanes/blades. The cooling holes create a cooling passage between a cavity of an airfoil and the outside surface of the vane/blade. This passage provides cooling fluid (e.g., cooling air) throughout the vane/blade to reduce the temperature during operation of the conventional turbine system.

However, because the holes are drilled directly into the vane/blade at a shallow angle to the surface, spallation (e.g., fragmentation of a material layer) typically occurs during manufacturing. Spallation of a ceramic layer formed over the vane/blade can reduce mechanical strength, which may cause premature mechanical failure of the vane/blade. Spallation can also cause mechanical defects in the vane/blade, which can preclude the defective vane/blade from being used in a conventional turbine system.

BRIEF DESCRIPTION OF THE INVENTION

Methods for manufacturing turbine nozzles having a non-linear cooling conduit are disclosed. In one embodiment, a method includes: providing a turbine nozzle having: an airfoil; a cavity located within the airfoil, the cavity including an inner surface; at least one endwall adjacent the airfoil; and a fillet region connecting the airfoil and the at least one endwall, the fillet region including an outer surface. The method also includes: forming a non-linear cooling conduit within the fillet region and adjacent the outer surface of the fillet region of the turbine nozzle.

A first aspect of the invention includes a method manufacturing a turbine nozzle. The method includes: providing a turbine nozzle having: an airfoil; a cavity located within the airfoil, the cavity including an inner surface; at least one endwall adjacent the airfoil; and a fillet region connecting the airfoil and the at least one endwall, the fillet region including an outer surface; and forming a non-linear cooling conduit within the fillet region and adjacent the outer surface of the fillet region of the turbine nozzle.

A second aspect of the invention includes another method of manufacturing a turbine nozzle. The method includes: providing a turbine nozzle having: an airfoil; at least one cavity located within the airfoil, the at least one cavity including an inner surface; at least one endwall adjacent the airfoil; and a fillet region connecting the airfoil and the at least one endwall, the fillet region including an outer surface; forming an aperture extending through the outer surface of the fillet region to the at least one cavity of the airfoil; forming a groove on a portion of the inner surface of the at least one cavity; coupling a cover plate to the inner surface of the at least one cavity of the turbine airfoil to substantially cover a portion of the groove; and forming a non-linear cooling conduit from the aperture, the groove and the cover plate, the non-linear cooling conduit located between the cavity of the airfoil and the outer surface of the fillet region.

A third aspect of the invention includes an additional method of manufacturing a turbine nozzle. The method includes: providing a turbine nozzle having: an airfoil; a first cavity located within the airfoil, the first cavity including an inner surface; a second cavity located within the airfoil, the second cavity adjacent the first cavity and including an inner surface; at least one endwall adjacent the airfoil; and a fillet region connecting the airfoil and the at least one endwall, the fillet region including an outer surface; and forming a non-linear cooling conduit within the fillet region and adjacent the outer surface of the fillet region, the non-linear cooling conduit in fluid communication with the first cavity and the second cavity of the turbine nozzle.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
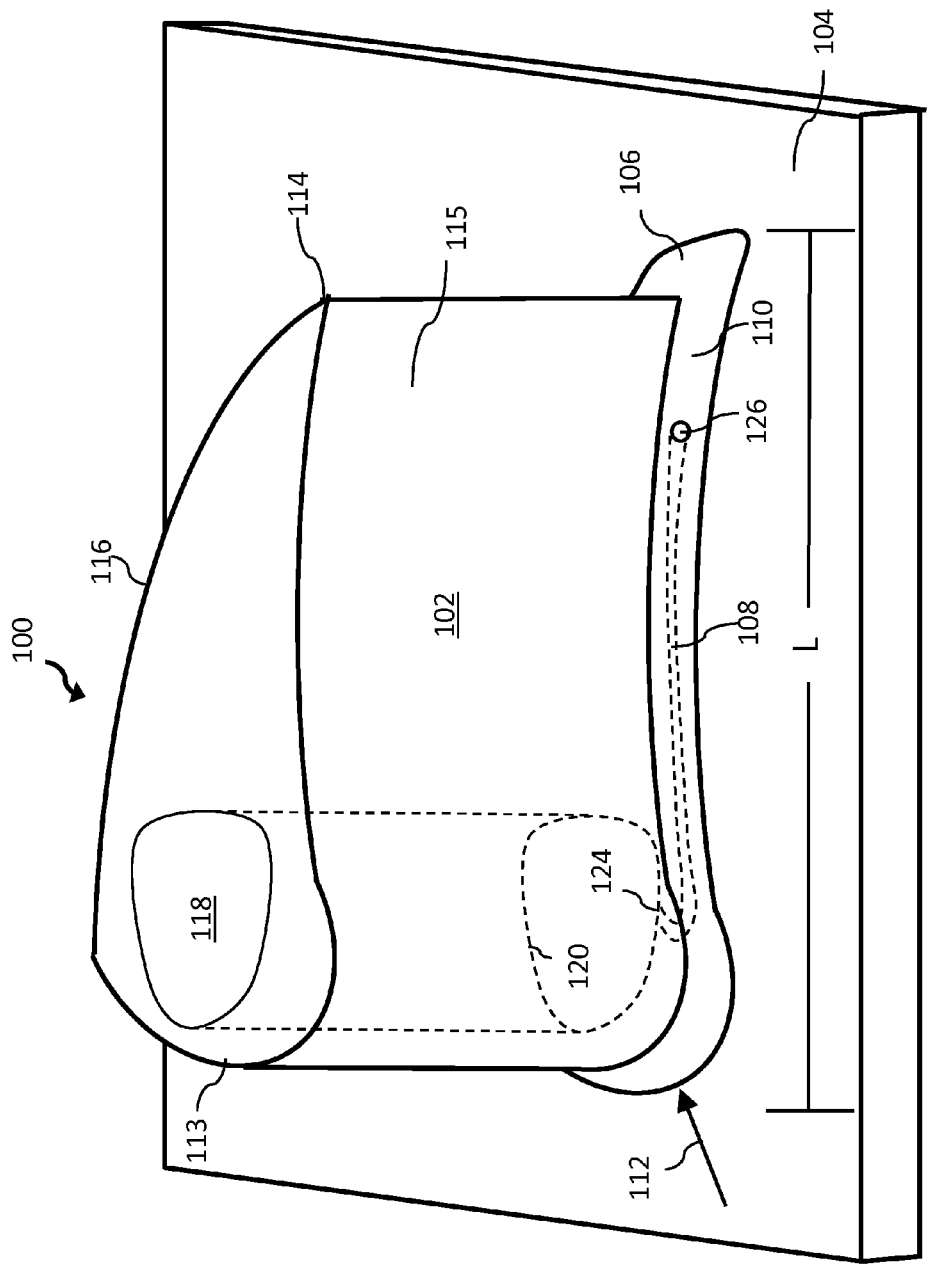
FIG. 1 shows a schematic cut-away perspective view of a turbine nozzle including a non-linear cooling conduit, according to embodiments of the invention.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As described herein, aspects of the invention relate to turbine systems. Specifically, aspects of the invention relate to a turbine nozzle having a non-linear cooling conduit, and turbines employing such nozzles.

Turning to FIG. 1, a schematic cut-away perspective view of a turbine nozzle including a non-linear cooling conduit is shown according to various embodiments of the invention. Turbine nozzle 100 can include a stator vane (static nozzle) in a static nozzle assembly, or a non-stationary (e.g., rotating) airfoil within a set of rotor airfoils for any conventional turbine system, e.g., a gas turbine system, steam turbine, system, etc. In various embodiments, turbine nozzle 100 is part of a gas turbine static nozzle assembly, e.g., including a plurality of turbine nozzles, which may include features similar to turbine nozzle 100 described herein.

Turbine nozzle 100 may include an airfoil 102, at least one endwall 104 adjacent airfoil 102, and a fillet region 106 connecting airfoil 102 and the at least one endwall 104. Fillet region 106 may be formed during the manufacturing of turbine nozzle 100. More specifically, airfoil 102 and endwall 104 may be separate components mechanically coupled by any now known or later developed method of mechanical coupling, e.g., welding, brazing, fastening, etc. In this example, fillet region 106 may be formed at the respective interfaces of airfoil 102 and endwall 104 that may be coupled to one another. In an alternative embodiment, where turbine nozzle 100 is created as a single, turbine component, fillet region 106 may be created during the casting process of turbine nozzle 100. More specifically, fillet region 106 may be formed during the same process of forming single component turbine nozzle 100 by any now known or later developed forming technique, e.g., integral casting, forging, milling, injection molding, etc. Turbine nozzle 100 may be made of any conventional material (e.g., nickel based alloy) used for creating nozzles used in a conventional combustion turbine system. Additionally, Turbine nozzle 100 may be coated in a ceramic layer or any other conventional thermal barrier material of lower thermal conductivity compared to the material used in forming turbine nozzle 100. The coating of turbine nozzle 100 may be used to withstand the high temperatures of conventional combustion turbine system, as is known in the art.

Airfoil 102 may be a conventional stator airfoil, and endwall 104 may be a vane sidewall in an embodiment where turbine nozzle 100 is a stator vane. In an alternative embodiment, where turbine nozzle 100 may be a rotating airfoil, airfoil 102 may be a conventional bucket airfoil, and endwall 104 may be a conventional bucket base or platform.

In an embodiment, as shown in FIG. 1, turbine nozzle 100 may also include a non-linear cooling conduit 108 located within fillet region 106 and adjacent an outer surface 110 of fillet region 106. Non-linear cooling conduit 108 may allow fluid flow through fillet region 106 of turbine nozzle 100. More specifically, non-linear cooling conduit 108 may carry cooling fluid along the length of non-linear cooling conduit 108 for cooling fillet region 106 as a hot gas flow 112 passes over turbine nozzle 100.

Figure 2:
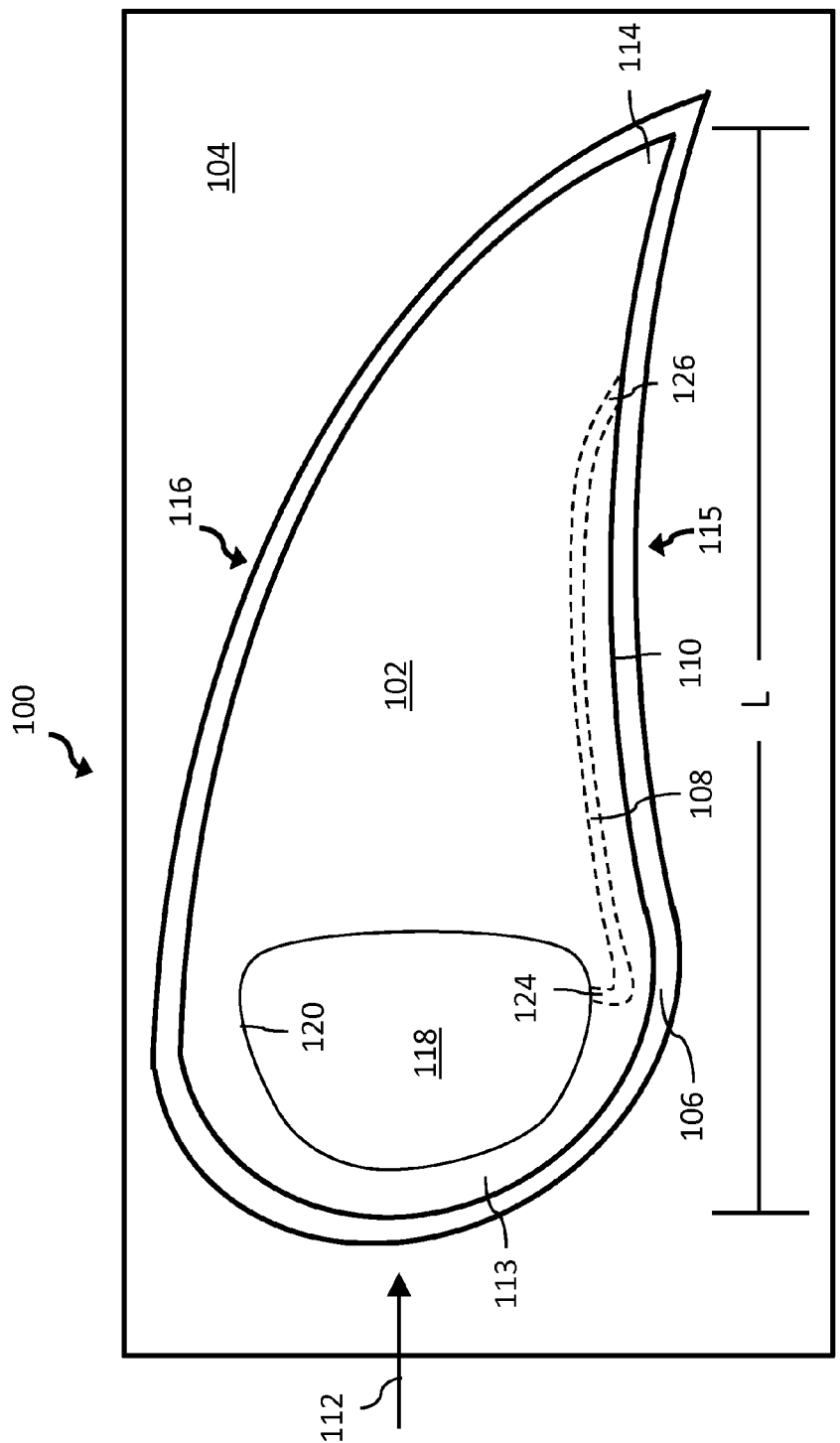
FIG. 2 shows a cross-sectional view of a turbine nozzle including a non-linear cooling conduit, according to embodiments of the invention.

In an embodiment, as shown in FIGS. 1 and 2, airfoil 102 may also include a leading edge 113, and a trailing edge 114 opposite leading edge 113. More specifically, leading edge 113 may be the first portion of turbine nozzle 100 in which hot gas flow 112 may pass over. Leading edge 113 may substantially divide hot gas flow 112 into two separate flow paths (e.g., pressure side and suction side) for flowing around airfoil 102 of turbine nozzle 100, as is known in the art. Trailing edge 114 may direct hot gas flow 112 in a desired direction as hot gas flow 112 flows off of airfoil 102 of turbine nozzle 100. Also shown in FIGS. 1 and 2, non-linear cooling conduit 108 may span substantially along an axial length (L) of airfoil 102 between leading edge 113 and trailing edge 114. More specifically, non-linear cooling conduit 108 may span for the majority (e.g., greater than 50%) of the axial length of airfoil 102. In contrast to conventional cooling holes, which are typically formed by straight drilling (e.g., rectilinear conduit) and formed substantially perpendicular to a face of a conventional airfoil, non-linear cooling conduit 108 may be positioned within fillet region 106 along the majority of an axial length (L) of airfoil 102 of turbine nozzle 100. In an embodiment, as shown in FIGS. 1 and 2, airfoil 102 may include a pressure face 115, and a suction face 116. As shown in FIGS. 1 and 2, non-linear cooling conduit 108 may be located proximate pressure face 115 of airfoil 102. In an alternative embodiment, as shown in FIG. 3, non-linear cooling conduit 108 may be located proximate suction face 116 of airfoil 102.

Figure 3:
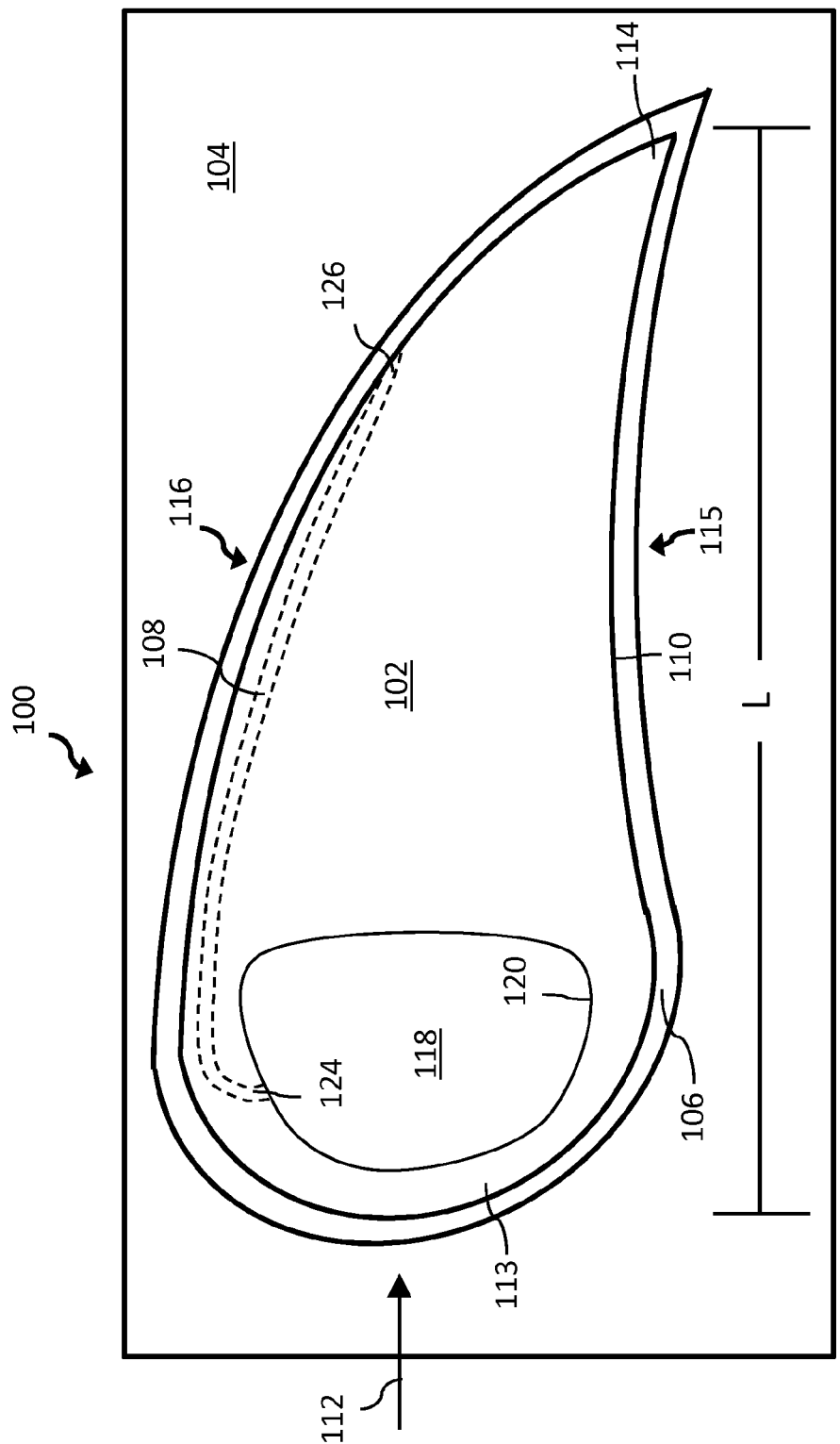
FIG. 3 shows a cross-sectional view of a turbine nozzle including a non-linear cooling conduit, according to an alternative embodiment of the invention.

As shown in FIGS. 1-3, non-linear cooling conduit 108 may include an arc profile substantially similar to an arc profile of airfoil 102. That is, non-linear cooling conduit 108 may be substantially non-linear with reference to the axial length (L), and may include an arc profile having a substantially similar arc profile as a respective face (e.g., pressure face 115, suction face 116) of airfoil 102. In an embodiment, as shown in FIG. 2, non-linear cooling conduit 108 may include a portion having an arc profile substantially similar to the arc profile of pressure face 115 of airfoil 102. In an alternative embodiment, as shown in FIG. 3, where non-linear cooling conduit 108 is located proximate suction side 116, non-linear cooling conduit 108 may include a portion having an arc profile substantially similar to the arc profile of suction face 116 of airfoil 102.

Figure 4:
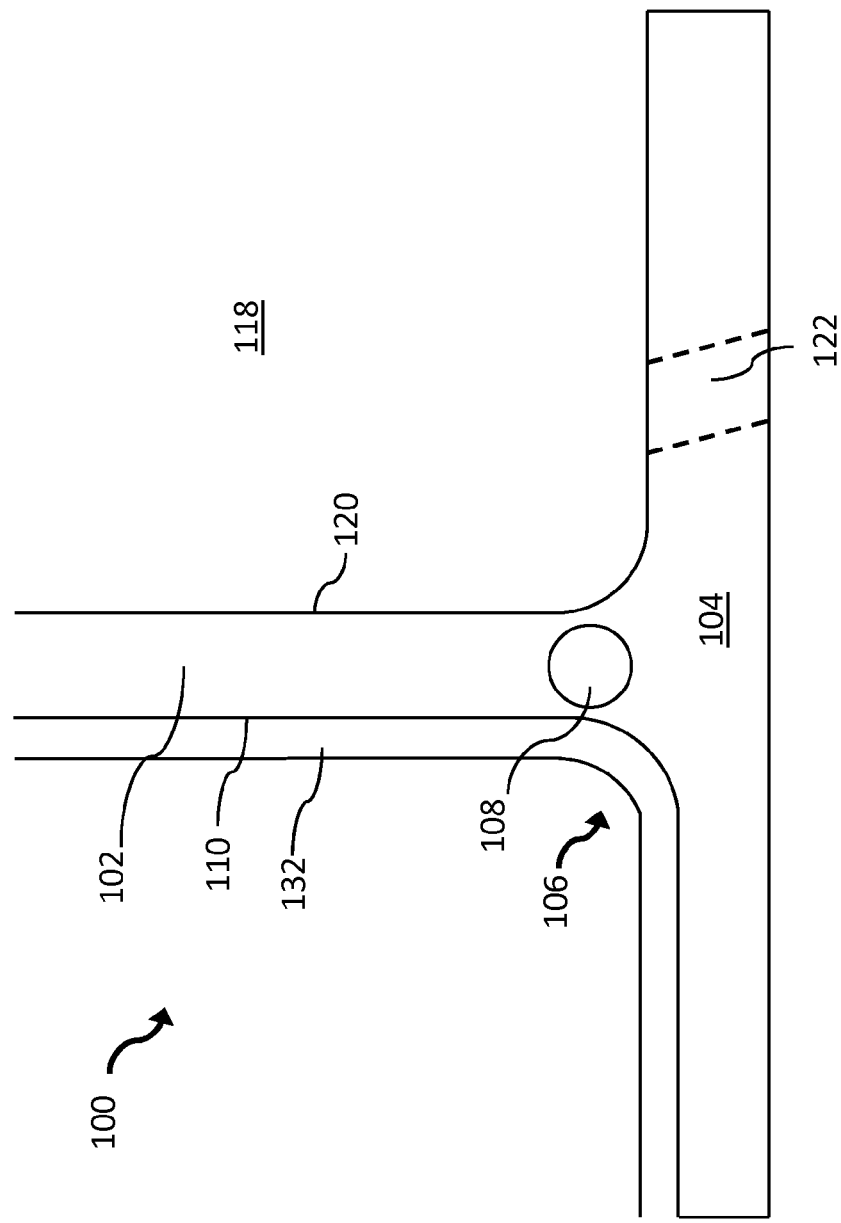
FIG. 4 shows a cross-sectional view of a portion of a turbine nozzle including a non-linear cooling conduit, according to embodiments of the invention.

As shown in FIGS. 1-2, airfoil 102 may include at least one cooling fluid cavity 118 having an inner surface 120. The at least one cooling fluid cavity 118 may be fluidly connected to non-linear cooling conduit 108 and may provide a cooling fluid (e.g., cooling air) to non-linear cooling conduit 108. Cooling fluid cavity 118 may receive cooling fluid from any conventional internal or external flow path for providing the cooling fluid to cooling fluid cavity 118. In an embodiment, as best shown in FIG. 4, endwall 104 may include an endwall aperture 122 in fluid communication with cooling fluid cavity 118 for providing cooling fluid to cooling fluid cavity 118. That is, cooling fluid positioned below cooling fluid cavity 118 may flow through endwall 104 and into cooling fluid cavity 118 via endwall aperture 122. It is understood that airfoil 102 may include at least one cavity (e.g., cooling fluid cavity 118, discharge cavity 128 (FIG. 5)), and more specifically, may include a plurality of cavities. The cavities of airfoil 102 may be configured as any geometric dimension within airfoil 102, such that a portion of airfoil 102 may be substantially hollow because of the cavities formed in airfoil 102. As such, it is also understood that the depicted dimensions and number of cavities (e.g., cooling fluid cavity 118, discharge cavity 128 (FIG. 5)) of airfoil 102 are merely exemplary embodiments and any number of configurations of the cavities of airfoil 102 may be included in accordance with embodiments described herein.

Returning to FIGS. 1 and 2, non-linear cooling conduit 108 may also include an inlet 124 located on inner surface 120 of cooling fluid cavity 118. Inlet 124 of non-linear cooling conduit 108 may receive the cooling fluid from cooling fluid cavity 118. More specifically, as best shown in FIG. 2, inlet 124 may continuously receive cooling fluid from cooling fluid cavity 118 in order to move the cooling fluid through non-linear cooling conduit 108.

In an embodiment, as best shown in FIGS. 1 and 2, non-linear cooling conduit 108 may also include an outlet 126 located on outer surface 110 of fillet region 106. Outlet 126 of non-linear cooling conduit 108 may discharge the cooling fluid from non-linear cooling conduit 108. More specifically, as shown in FIGS. 1 and 2, outlet 126 may receive the cooling fluid flowing through non-linear cooling conduit 108 and may discharge the cooling fluid from turbine nozzle 100. In an embodiment, as shown in FIGS. 1 and 2, outlet 126 may be fluidly connected to a flow path of a turbine fluid (e.g., hot gas flow 112) flowing over turbine nozzle 100. More specifically, outlet 126 may discharge the cooling fluid to a flow path of hot gas flow 112, as hot gas flow 112 passes over turbine nozzle 100. Although one outlet 126 is shown, it is understood that the non-linear cooling conduit 108 may include a plurality of outlets 126 positioned along the length of non-linear cooling conduit 108. The plurality of outlets 126 of non-linear cooling conduit 108 may discharge cooling fluid to outer surface 110 of fillet region 106 in a plurality of locations for cooling fillet region 106 of turbine nozzle 100.

Figure 5:
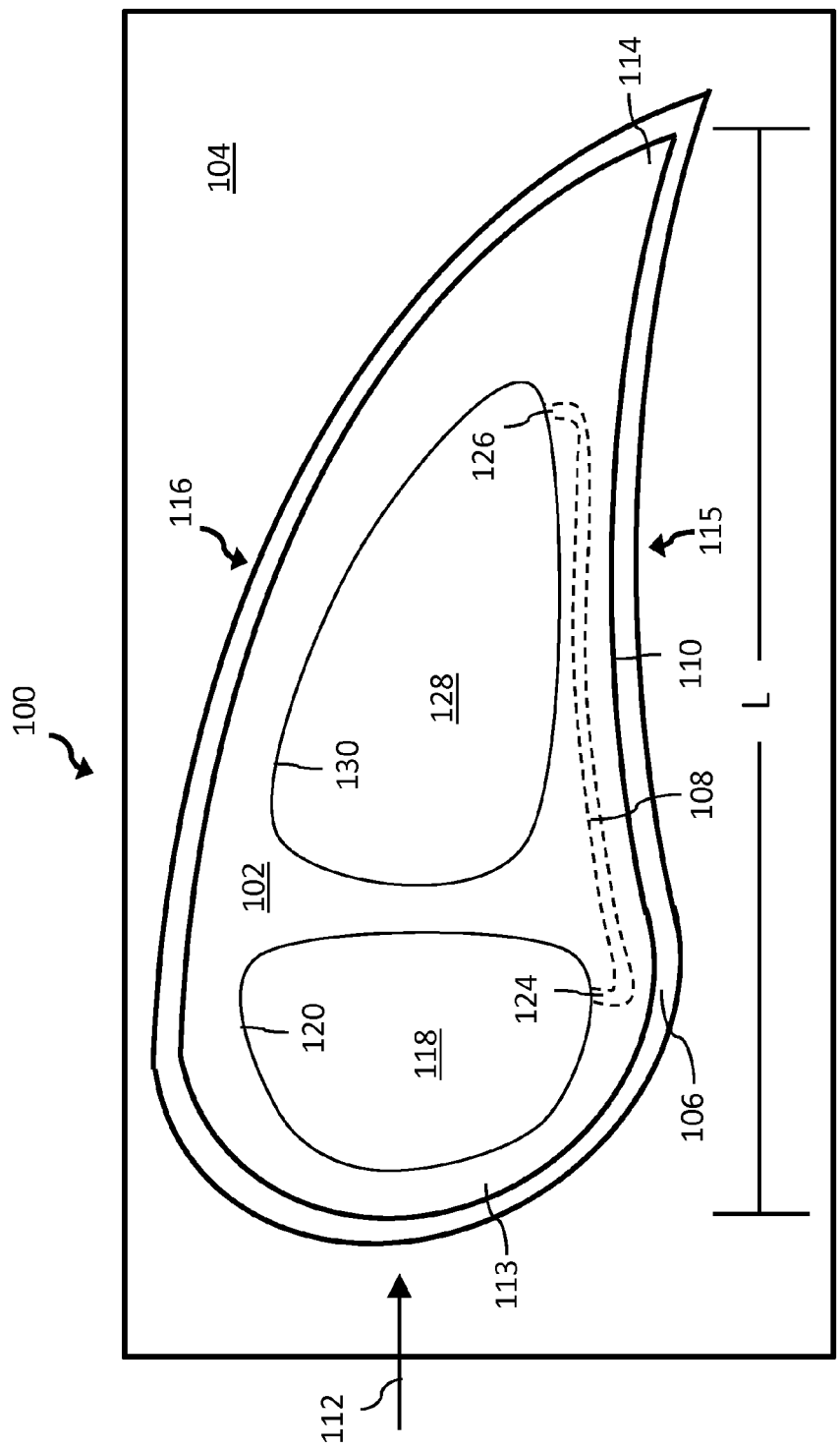
FIG. 5 shows a cross-sectional view of a turbine nozzle including a non-linear cooling conduit, according to a further alternative embodiment of the invention.
Figure 6:
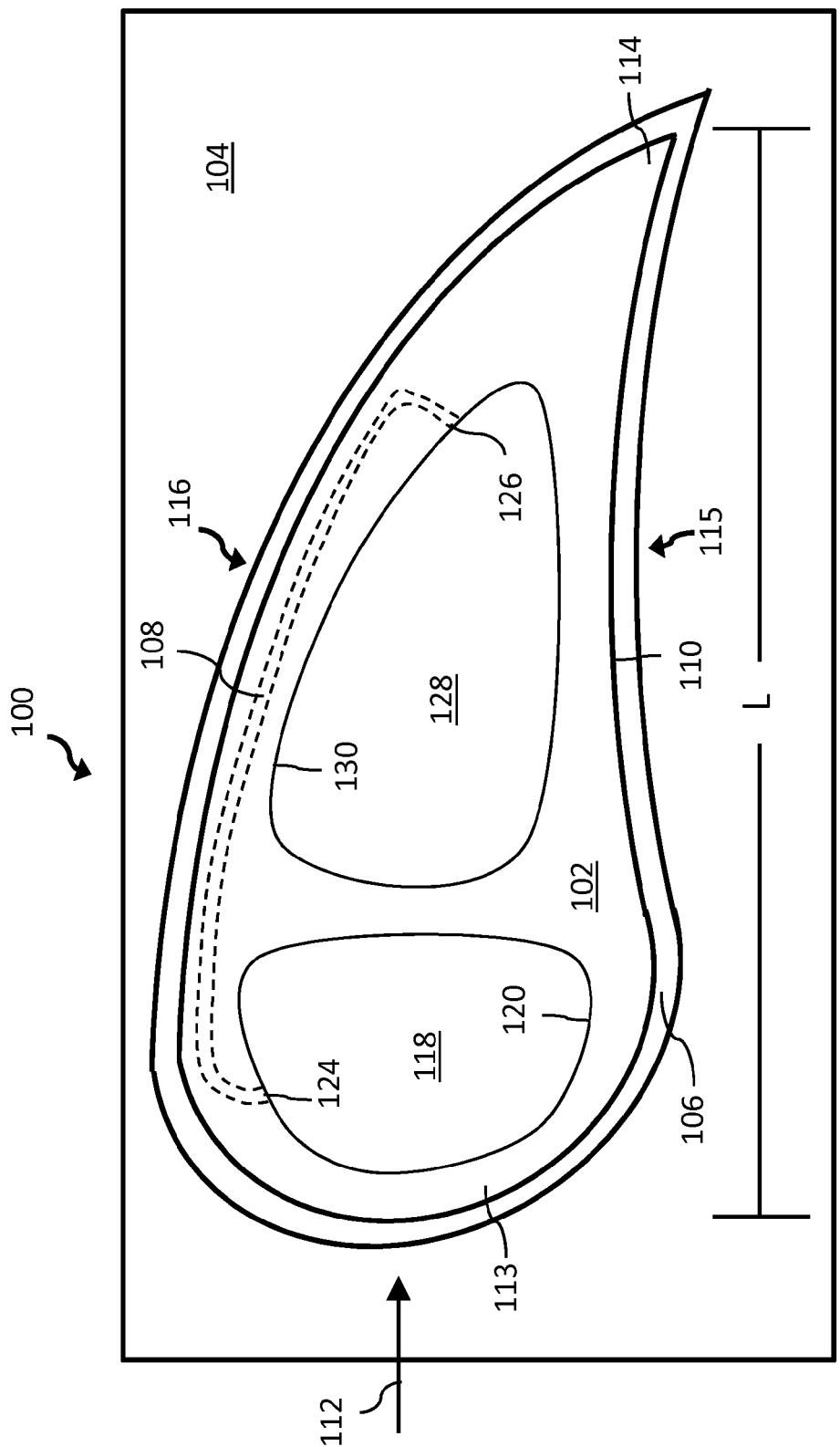
FIG. 6 shows a cross-sectional view of a turbine nozzle including a non-linear cooling conduit, according to an additional alternative embodiment of the invention.

In alternative embodiments, as shown in FIGS. 5 and 6, airfoil 102 of turbine nozzle 100 may also include a discharge cavity 128. Discharge cavity 128 may be located within airfoil 102 of turbine nozzle 100 and may be substantially adjacent cooling fluid cavity 118. Additionally, discharge cavity 128 may receive discharged cooling fluid from non-linear cooling conduit 108. In an embodiment, as shown in FIGS. 5 and 6, outlet 126 may be fluidly connected to discharge cavity 128. More specifically, outlet 126 may be located on an inner surface 130 of discharge cavity 128, and cooling fluid may be discharged from outlet 126 of non-linear cooling conduit 108 to discharge cavity 128 of turbine nozzle 100.

Referring back to FIG. 4, a cross-sectional view of a portion of turbine nozzle 100 including non-linear cooling conduit 108, according to embodiments of the invention is provided. In the Figures, it is understood that similarly numbered components may represent substantially similar components, which can function in a substantially similar manner. Redundant explanation of these components has been omitted for clarity. As shown in FIG. 4, turbine nozzle 100 may also include at least one thermal barrier coating 132 over outer surface 110. Thermal barrier coating 132 may additionally insulate turbine nozzle 100. More specifically, thermal barrier coating 132 may also act as an insulator of turbine nozzle 100 such that, thermal barrier coating 132 may prevent outer surface 110 of turbine nozzle from coming in direct contact with the hot gas flow. Additionally, thermal barrier coating 132 may substantially prevent the cooling fluid from rising in temperature within cooling fluid cavity 118 before cooling fluid is received by inlet 124 and moved through non-linear cooling conduit 108.

Figure 7:
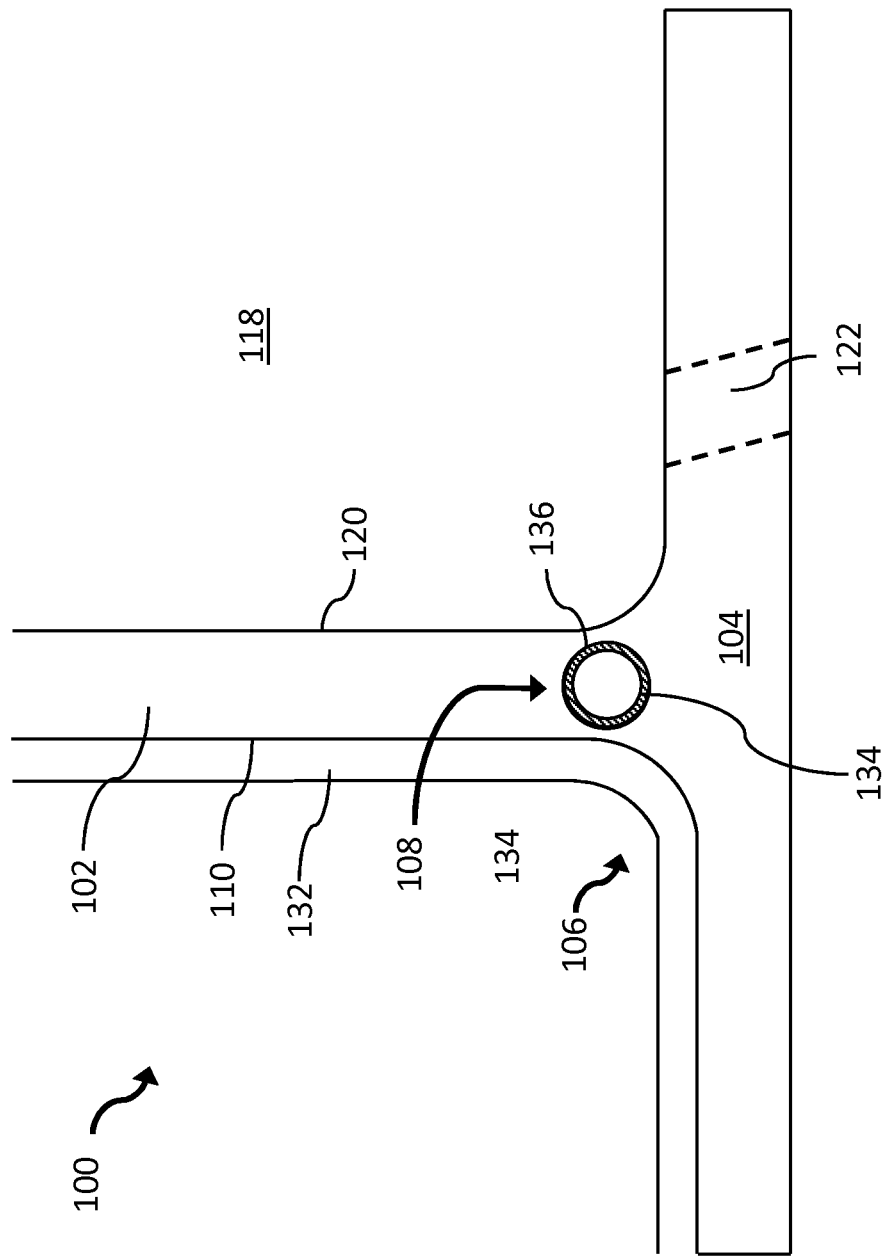
FIG. 7 shows a cross-sectional view of a portion of a turbine nozzle including a non-linear cooling conduit having turbulators, according to embodiments of the invention.

Turning to FIG. 7, a cross-sectional view of a portion of turbine nozzle 100 including non-linear cooling conduit 108 having at least one turbulator 134, according to embodiments of the invention is provided. In an embodiment, as shown in FIG. 7, non-linear cooling conduit 108 may further include an inner surface 136 and at least one turbulator 134 formed on inner surface 136 of non-linear cooling conduit 108. The turbulators 134, as shown in FIG. 7, may modify fluid flow through non-linear cooling conduit 108. More specifically, turbulators 134 may provide roughness to inner surface 136 of non-linear cooling conduit 108, which may, in part, enhance heat transfer within non-linear cooling conduit 108 by increasing surface area and turbulent mixing for more effective cooling. Ultimately, the inclusion of turbulators 134 may allow the cooling fluid to more effectively cool fillet region 106 as the cooling fluid passes through non-linear cooling conduit 108. Turbulators 134 may be formed on inner surface 136 by any conventional technique now known or later developed. For example, turbulators 134 may be formed on inner surface 136 by utilizing an electrode when either when forming or after forming non-linear cooling conduit 108. In one method, insulation is stripped from the electrode except for regions were the turbulators are to be placed. The electrode removes additional material only adjacent the exposed regions, leaving behind the turbulations in the unexposed regions.

Figure 8:
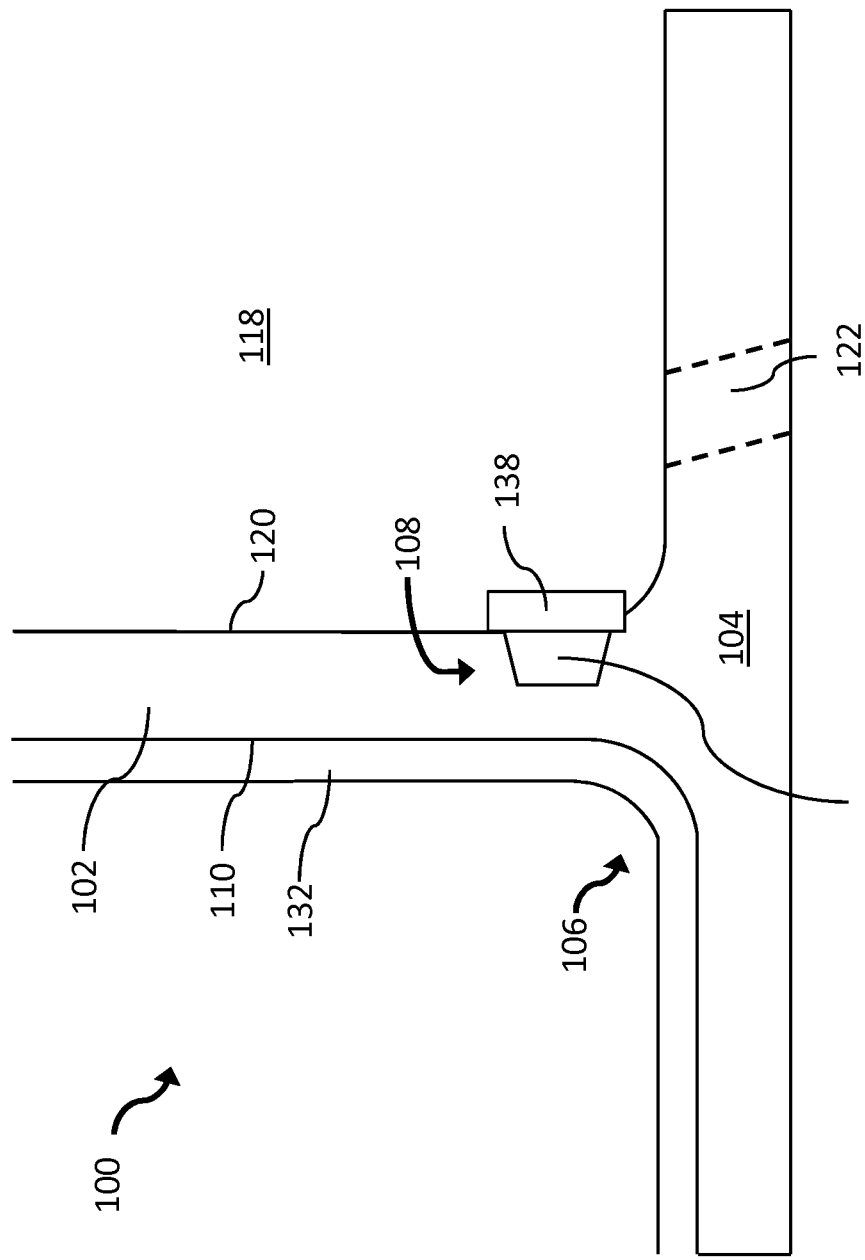
FIG. 8 shows a cross-sectional view of a portion of a turbine nozzle including a non-linear cooling conduit and a cover plate, according to embodiments of the invention.
Figure 9:
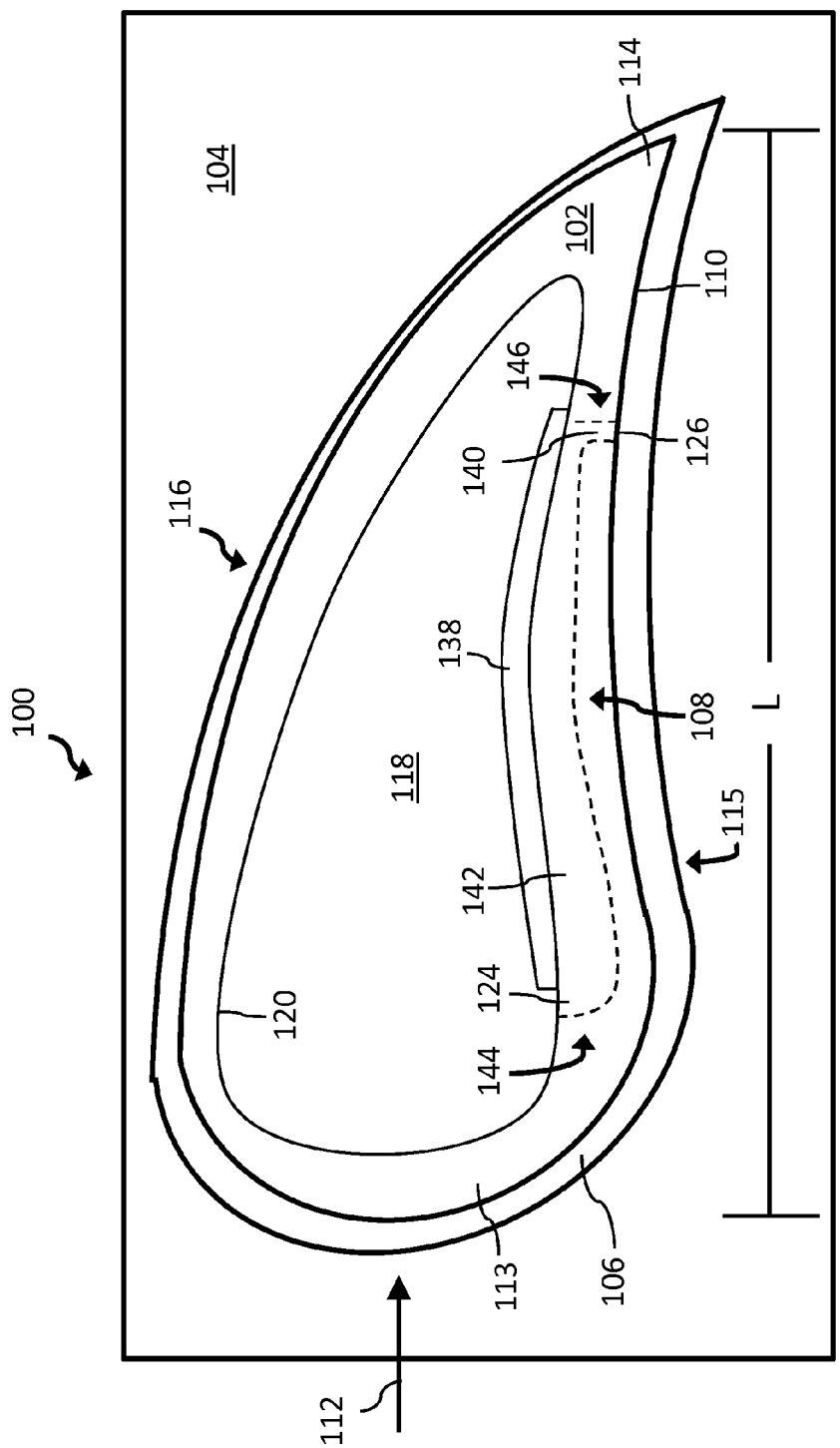
FIG. 9 shows a cross-sectional view of a turbine nozzle including a non-linear cooling conduit and a cover plate, according to embodiments of the invention.

Turning to FIG. 8, a cross-sectional view of turbine nozzle 100 including a non-linear cooling conduit 108 and a cover plate 138, according to embodiments of the invention is shown. In an embodiment, as shown in FIGS. 8 and 9, turbine nozzle 100 may include airfoil 102, cavity 118 located within airfoil 102, the cavity including inner surface 120, at least one endwall 104 adjacent airfoil 102 and fillet region 106 connecting airfoil 102 and endwall 104, where fillet region 106 includes outer surface 110. As shown in FIGS. 8 and 9, turbine nozzle 100 may also include an aperture 140 located on fillet region 106. Aperture 140 may extend through outer surface 110 of fillet region 106 to cooling fluid cavity 118 located within airfoil 102. More specifically, as shown in FIGS. 8 and 9, aperture 140 may be formed on outer surface 110 of fillet region 106 and may extend through airfoil 102 to inner surface 120 of cooling fluid cavity 118. Aperture 140 may be formed by any now know or later developed technique, as discussed in greater detail below.

In an embodiment, as shown in FIGS. 8 and 9, turbine nozzle 100 may also include a groove 142 formed on a portion of inner surface 120 of fillet cooling fluid cavity 118 substantially adjacent aperture 140. More specifically, as shown in FIG. 9, groove 142 may include a first end 144 formed on inner surface 120 of cooling fluid cavity 118, and a second end 146 formed a predetermined distance away from first end 144 of groove 142 in the axial length (L). Second end 146 of groove 142 may intersect aperture 140 of turbine nozzle 100, and more specifically, second end 146 may be end and be integral with aperture 140. As shown in FIG. 9, groove 142 may span substantially along the axial length (L) of airfoil 102 between leading edge 113 and trailing edge 114, as similarly described with respect to FIGS. 1 and 2. Groove 142 may be formed by any now know or later developed technique, as discussed in detail below.

Also shown in FIGS. 8 and 9, turbine nozzle 100 may include cover plate 138 positioned over aperture 140 and a portion of groove 142 formed on inner surface 120 of cooling fluid cavity 118. In an embodiment, as shown in FIGS. 8 and 9, cover plate 138 may form non-linear cooling conduit 108 between cooling fluid cavity 118 of airfoil 102 and outer surface 110 of fillet region 106. In an embodiment, as shown in FIG. 9, non-linear cooling conduit 108 may be formed such that cooling fluid of cooling fluid cavity 118 may be received by first end 144 of groove 142, which may not be covered by cover plate 138, and move between cover plate 138 and groove 142 along the axial length (L) of airfoil 102 of turbine nozzle 100 in order to cool fillet region 106. As previously discussed with respect to FIGS. 1 and 2, cooling fluid cavity 118 may include the cooling fluid for cooling fillet region 106 of turbine nozzle 100 via non-linear cooling conduit 108.

As shown in FIG. 8, cover plate 138 may be coupled to inner surface 120 of cooling fluid cavity 118 to form an airtight seal between cover plate 138 and groove 142 so cooling fluid may move through the formed non-linear cooling conduit 108. In an embodiment, as shown in FIG. 9, cover plate 138 may be formed to include a curve in the axial direction in order to ensure non-linear cooling conduit 108 is substantially curved (e.g., non-linear). As shown in FIG. 9, cover plate 138 includes an arc profile substantially similar to the arc profile of airfoil 102. More specifically, cover plate 138 may be coupled to a face (e.g., pressure face 115) of airfoil 102 and may include an arc profile substantially similar to the arc profile of the face (e.g., pressure face 115) of airfoil 102.

In an embodiment, as shown in FIG. 9, non-linear cooling conduit 108 may be located within fillet region 106 proximate pressure face 115 of airfoil 102. This is similar to an embodiment as shown in FIGS. 1 and 2. In an alternative embodiment, not shown, and similar to an embodiment as shown in FIG. 3, non-linear cooling conduit 108 may be located within fillet region 106 proximate suction face 116 of airfoil 102.

Also shown in FIG. 9, non-linear cooling conduit 108 may also include inlet 124 located on inner surface 120 of cavity 118, as similarly discussed above. The inlet 124 may be formed by groove 142. Additionally, non-linear cooling conduit 108, as shown in FIG. 9, may include outlet 126 located on outer surface 110 of fillet region 106. In an embodiment, as best seen in FIG. 9, outlet 126 may be formed by groove 142 formed by aperture 140. More specifically, outlet 126 may be formed by covering second end 146 of groove 142 and aperture 140 with cover plate 138. By covering aperture 140 and a portion of groove 142, excluding first end 144, cover plate 138 forms a conduit (e.g., non-linear cooling conduit 108) in fluid communication with cooling fluid cavity 118 and outer surface 110 of fillet region 106. As similarly described above, outlet 126 of non-linear cooling conduit 108 is fluidly connected to a flow path of a turbine fluid (e.g., hot gas flow 110) flowing over turbine nozzle 100, as best shown in FIG. 9.

Figure 10:
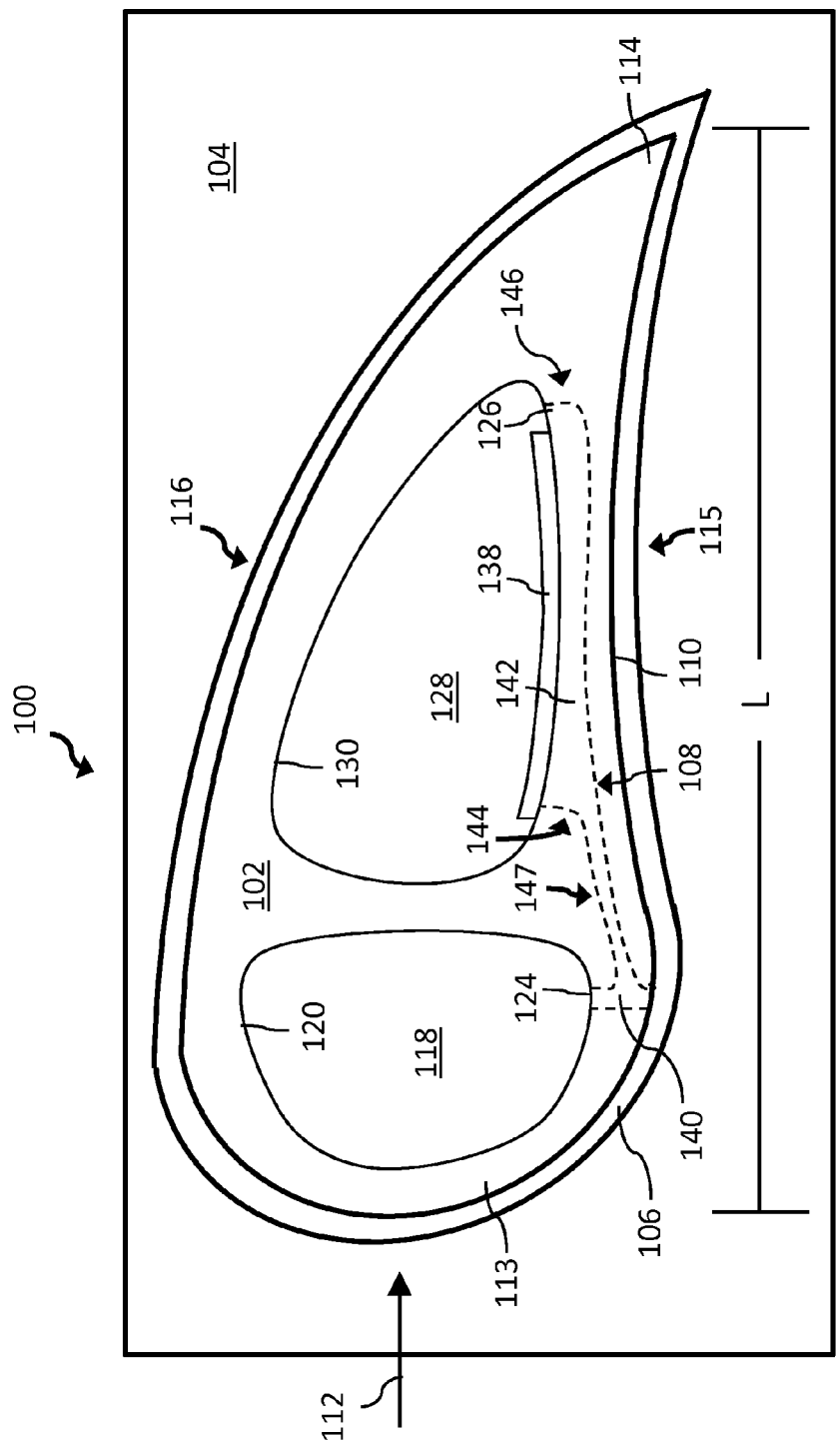
FIG. 10 shows a cross-sectional view of a turbine nozzle including a non-linear cooling conduit and a cover plate, according to an alternative embodiment of the invention.

In an alternative embodiment, as shown in FIG. 10, outlet 126 of non-linear cooling conduit 108 formed by cover plate 138 may be fluidly connected to discharge cavity 128. More specifically, and as previously described with respect to FIGS. 5 and 6, airfoil 102 may include cooling fluid cavity 118 and a discharge cavity 128, such that non-linear cooling conduit 108 may move cooling fluid from cooling fluid cavity 118 to discharge cavity 128 for cooling fillet region 106 of turbine nozzle 100. As shown in FIG. 10, aperture 140 may be formed through outer surface 110 of airfoil 102 to cooling fluid cavity 118. Aperture 140 may form inlet 124 of non-linear cooling conduit 108 on inner surface 120 of cooling fluid cavity 118. More specifically, as shown in FIG. 10, aperture 140 may be formed partially through airfoil 102, in order to aid in forming non-linear cooling conduit 108, as described below. As shown in FIG. 10, cooling fluid cavity 118 may be in fluid communication with discharge cavity 128 by non-linear cooling conduit 108. More specifically, a passage 147 may be formed in airfoil 102 to fluidly connect cooling fluid cavity 118 and discharge cavity 128.

In an embodiment, as shown in FIG. 10, groove 142 may be formed on inner surface 130 of discharge cavity 128 substantially adjacent passage 147. More specifically, groove 142 may include first end 144, substantially adjacent passage 147, and second end 146 formed a predetermined distance away from first end 144 of groove 142 in the axial length (L) of discharge cavity 128. As shown in FIG. 10, and in contrast to FIG. 9, cover plate 138 may be coupled to inner surface 130 of discharge cavity 128 and may cover first end 144, and not second end 146 of groove 142. As such, the uncovered portion of groove 142 at second end 146 may form outlet 126. As discussed above with reference to FIGS. 5 and 6, outlet 126 of non-linear cooling conduit 108 may continuously discharge cooling fluid into discharge cavity 128 during the operation of a turbine system utilizing turbine nozzle 100.

Figure 11:
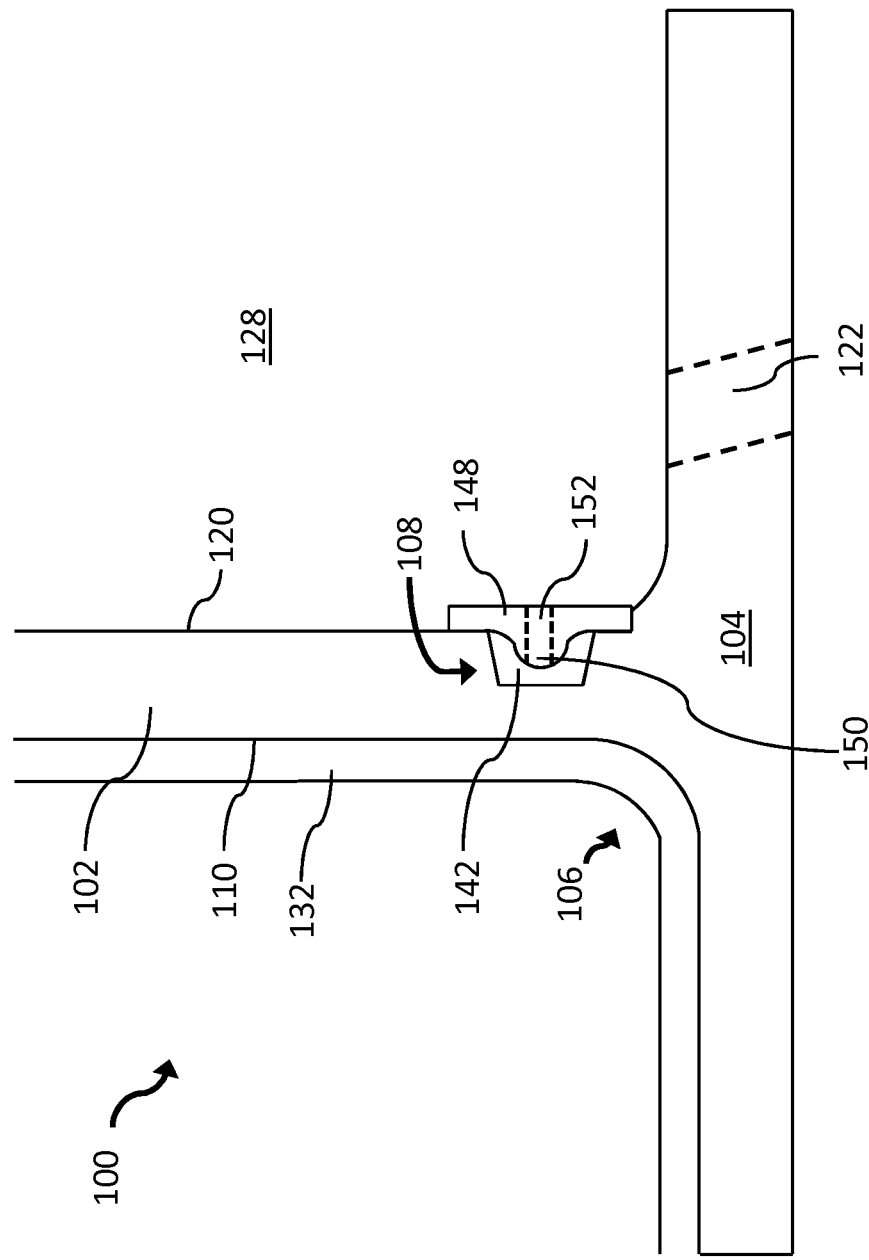
FIG. 11 shows a cross-sectional view of a portion of a turbine nozzle including a non-linear cooling conduit and an impingement plate, according to an additional alternative embodiment of the invention.

Turning to FIG. 11, a vertical cross-sectional view of a portion of turbine nozzle 100 including non-linear cooling conduit 108 and an impingement plate 148, according to an alternative embodiment of the invention is provided. In an embodiment, as shown in FIG. 11, impingement plate 148 may include a protrusion 150 positioned in the center of impingement plate 148. Protrusion 150 may substantially extend into the center of non-linear cooling conduit 108 formed by impingement plate 148, and groove 142. As shown in FIG. 11, impingement plate 148 may also include at least one cooling hole 152 positioned along the length of impingement plate 148. Cooling hole 152 may extend substantial through impingement plate 148, and may be in fluid communication with non-linear cooling conduit 108. Cooling hole(s) 152 may improve heat transfer within non-linear cooling conduit 108 along the axial length (L) of airfoil 102 due to impingement cooling on the back side of turbine nozzle 100. Cooling hole(s) 152 provide both supply ports for coolant and enhanced heat transfer for the cooling fluid within non-linear cooling conduit 108 before reaching outlet 126, in order to provide cooling to fillet region 106 as hot gas flow 112 (FIG. 1) flows over turbine nozzle 100. The use of cooling hole(s) 152 by turbine nozzle 100 may allow form specific spot cooling of fillet region 106. More specifically, cooling hole(s) 152 may provide enhanced heat transfer to a specific portion of non-linear cooling conduit 108 in a specific location of fillet region 106 that may require extra cooling due to hot gas flow 110 flowing over turbine nozzle 100.

Figure 12:
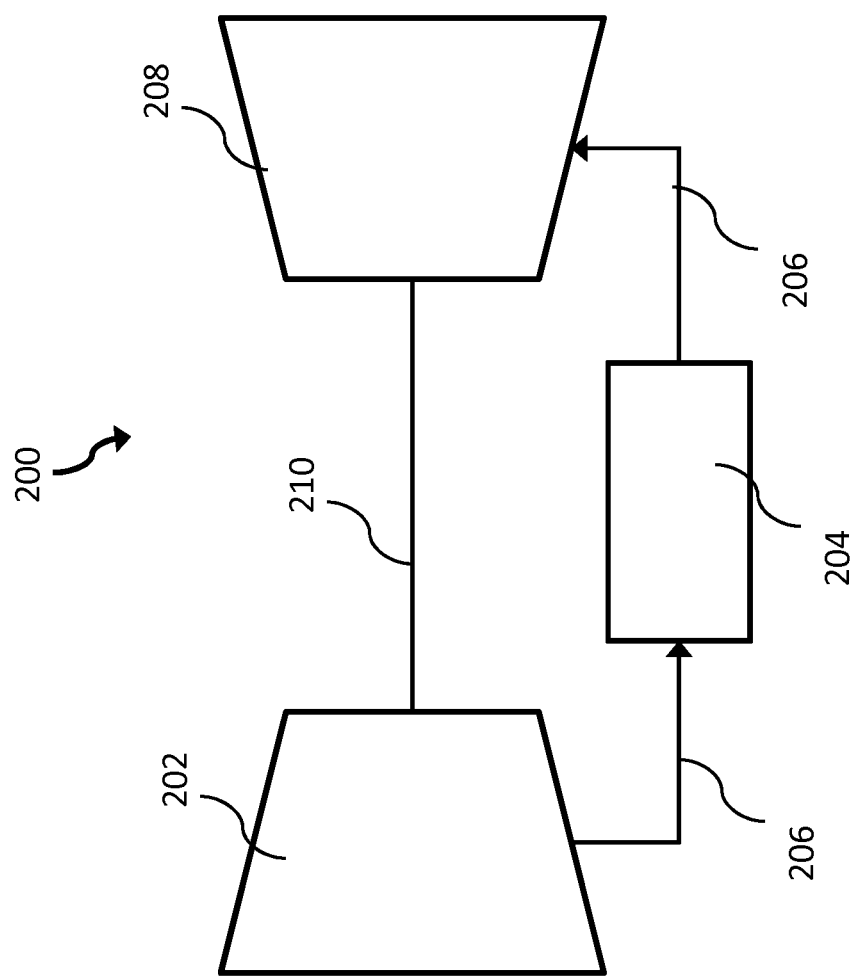
FIG. 12 shows a schematic depiction of a turbine system including a turbine nozzle, according to embodiments of the invention.
Figure 13:
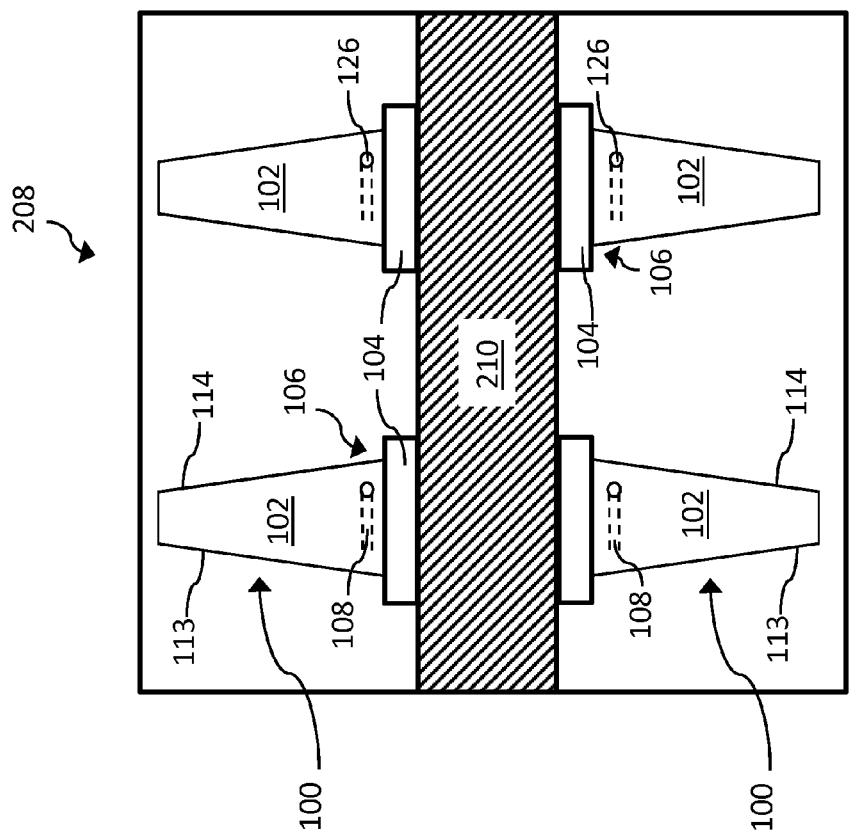
FIG. 13 shows a cross-sectional view of a portion of a turbine including a turbine nozzle, according to embodiments of the invention.

Turning to FIGS. 12 and 13, a schematic depiction of a turbine system and a cross-sectional view of a portion of a turbine of the turbine system are shown according to embodiments of the invention. In an embodiment, as shown in FIG. 12, turbine system 200 may include any conventional combustion turbine system for generating power. As such, basic functionality of the majority of turbine system 200 and the turbine system components as shown in FIG. 12 is provided below for clarity. Turbine system 200 may include a compressor 202, a combustor 204 in fluid communication with compressor 202 via conduit 206, and a turbine 208 in fluid communication with combustor 204. Turbine 208 may also be coupled to compressor 202 via shaft 210. As best shown in FIG. 13, turbine 208 of turbine system 200 may include at least one turbine nozzle 100. More specifically, in an embodiment, as shown in FIG. 13, turbine nozzle 100 may be a rotating airfoil coupled to shaft 210 of turbine system 200. As shown in FIG. 13, a plurality of turbine nozzles 100 may be coupled to shaft 210 to provide the various stages of buckets included in conventional gas turbines, e.g., turbine 208. In an embodiment, as shown in FIG. 13, endwall 104 may be a bucket base and airfoil 102 may be a bucket blade included in turbine system 200, such that turbine nozzle 100 may aid in moving hot gas flow 110 through turbine system 200. In an alternative embodiment where turbine nozzle 100 may be a stator vane (not shown), turbine nozzle 100 may be coupled to a housing (not shown) of turbine 208 for directing turbine fluid (e.g., hot gas flow 110) through turbine 208.

As shown in FIG. 13, and as described above, turbine nozzle 100 may include airfoil 102, at least one endwall 104 adjacent airfoil 102, fillet region 106 connecting airfoil 102 and endwall 104 including outer surface 110, as previously discussed with reference to FIGS. 1 and 2. As similarly described above, turbine nozzle 100 may also include non-linear cooling conduit(s) 108 located within fillet region 106 and adjacent outer surface 110 of fillet region 106. Non-linear cooling conduit 108 may allow fluid flow through fillet region 106 during operation of turbine system 200. As similarly shown and described with reference to FIGS. 1 and 2, non-linear cooling conduit 108 spans substantially along an axial length (L) of airfoil 102 between leading edge 113 and trailing edge 114. Additionally, non-linear cooling conduit includes an arc profile substantially similar to an arc profile of airfoil 102.

By including an arc profile substantially similar to the arc profile of pressure face 115 (FIG. 2) or suction face 116 (FIG. 3) of airfoil 102, non-linear cooling conduit 108 may be positioned adjacent outer surface 110 of fillet region 106 for allowing fluid flow through cooling fillet region 106 during operation of turbine system 200. That is, a single non-linear cooling conduit 108 positioned substantially along the axial length (L) of airfoil 102 and adjacent outer surface 110 of fillet region 106 may provide fillet region 106 with improved cooling means during operation of turbine system 200. Additionally, as a result of including non-linear cooling conduit 108 within fillet region 106, the need for cooling fluid that may transported through non-linear cooling conduit 108 may be reduced during operation of turbine system 200. More specifically, because non-linear cooling conduit is positioned substantially along the axial length (L) of airfoil 102, the cooling fluid in non-linear cooling conduit 108 may utilize its maximum heat-capacity for cooling fillet region 106, before being discharged from non-linear cooling conduit 108.

Various additional embodiments of the invention can include a method of cooling a turbine nozzle, e.g., turbine nozzle 100. In some embodiments, the method of cooling may include providing turbine nozzle 100. As previously discussed above with reference to FIGS. 1 and 2, turbine nozzle 100 may including airfoil 102, cavity 118 located within airfoil 102, endwall 104 adjacent airfoil 102, fillet region 106 connecting airfoil 102 and endwall 104, and non-linear cooling conduit 108 located in fillet region 106 and adjacent outer surface 110 of fillet region 106. Non-linear cooling conduit 108 of turbine nozzle 100 may also include inlet 124 located on inner surface 120 of cavity 118 and outlet 126 located on outer surface 110 of fillet region 106. The method of cooling turbine nozzle 100 may also include providing cooling fluid to cavity 118 via endwall aperture 122. The method of cooling may further include continuously providing cooling fluid from cavity 118 to inlet 124 of non-linear cooling conduit 108 during operation of turbine system 200, and moving the cooling fluid through non-linear cooling conduit 108 substantially along the axial length (L) of airfoil 102. Finally, the method of cooling nozzle 100 may include discharging the cooling fluid from outlet 126 of non-linear cooling conduit 108 to one of a flow path of a turbine fluid (e.g., hot gas flow 112) flowing over turbine nozzle 100, or discharge cavity 128 located within airfoil 102 of turbine nozzle 100.

As described above, turbine nozzle 100 may be including in a gas turbine system, e.g., turbine system 200. It is understood, however, that turbine nozzle 100 may be utilized by a steam turbine system, where turbine nozzle 100 may include a stator vane (static nozzle) in a static nozzle assembly, or a non-stationary (e.g., rotating) airfoil within a set of rotor airfoils for any conventional steam turbine system.

Although only a single non-linear cooling conduit 108 is included in turbine nozzle 100, it is understood that that a plurality of non-linear cooling conduits 108 may be utilized by turbine nozzle 100 for cooling fillet region 106. More specifically, it is understood that a plurality of non-linear cooling conduits 108 may be positioned in series and/or in parallel of each other along a face (e.g., pressure face 115, suction face 116) of turbine nozzle 100. The plurality of non-linear cooling conduits 108 may provide cooling fluid along a fillet region 106 of turbine nozzle 100 to substantially cool the fillet region 106, as well as provide specific section or location cooling in areas of turbine nozzle 100 that may require additional cooling. That is, the plurality of non-linear cooling conduits may have a plurality of outlets 126 positioned in specific locations of fillet region 106 to provide additional cooling fluid in the specific locations of turbine nozzle 100.

Figure 14:
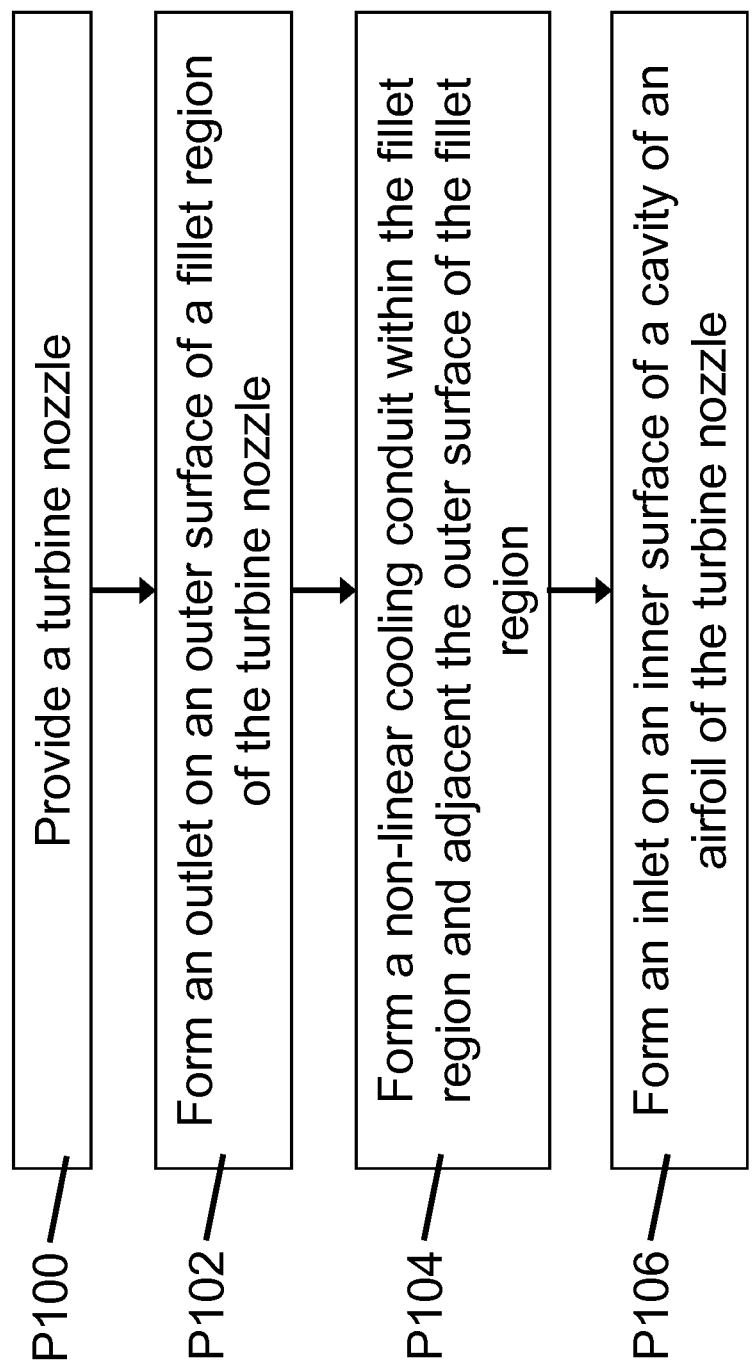
FIG. 14 shows a flow diagram illustrating a method for manufacturing a turbine nozzle according to embodiments of the invention.
Figure 15:
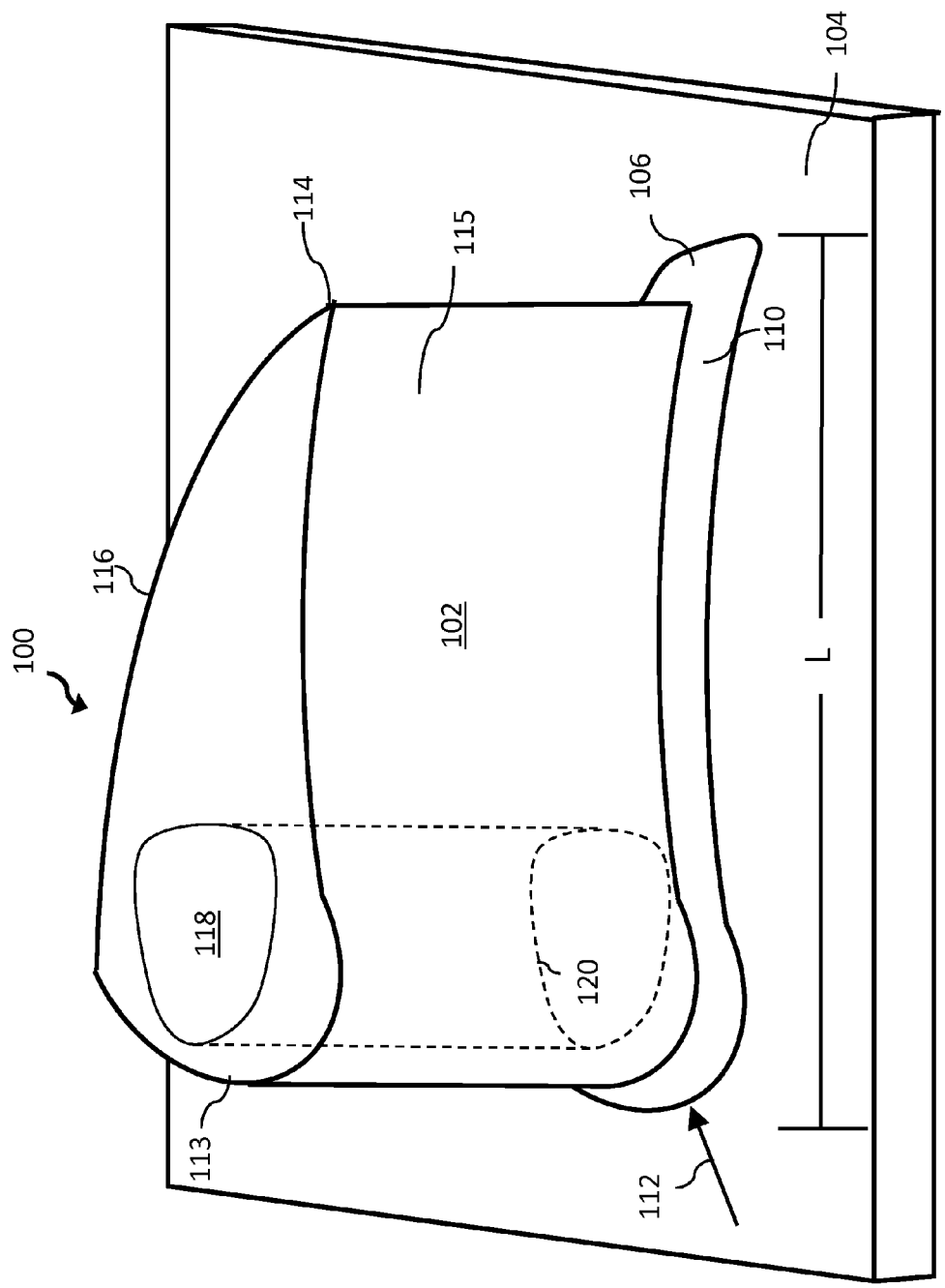
FIGS. 15-17 show a schematic cut-away perspective view of a turbine nozzle undergoing a method for manufacturing as illustrated by flow diagram of FIG. 14, according to embodiments of the invention.
Figure 16:
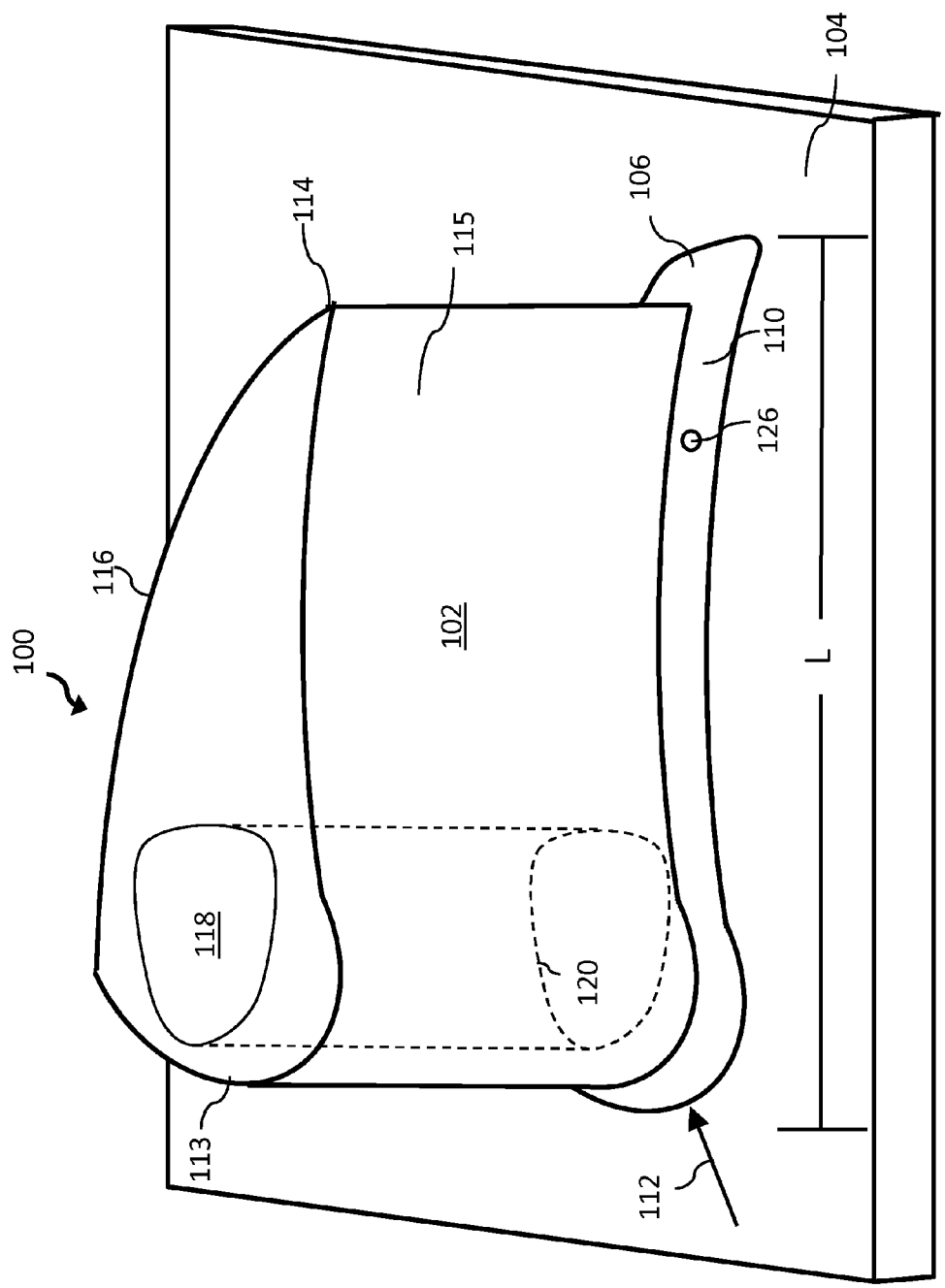
Figure 17:
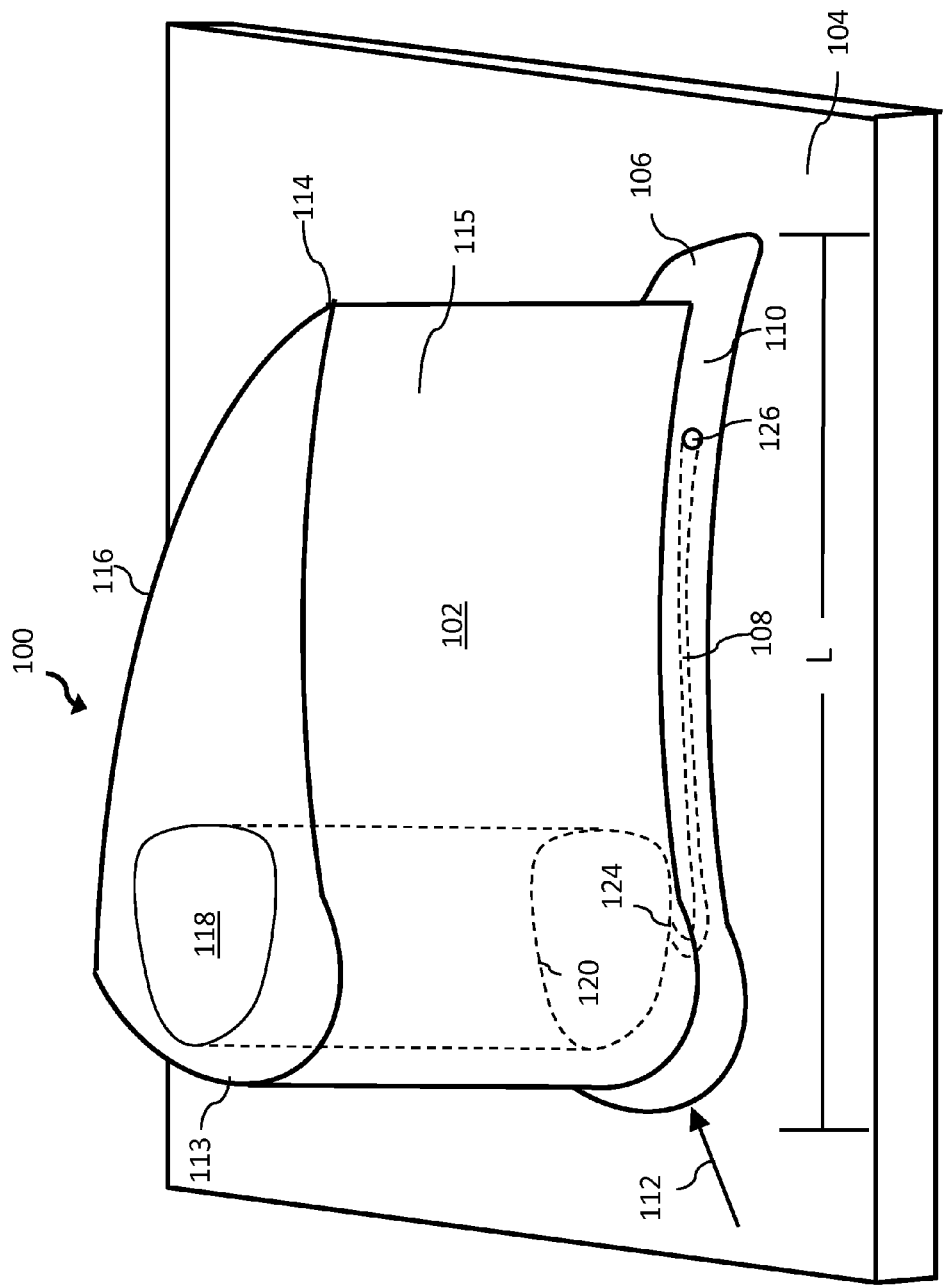

Various additional embodiments of the invention can include a method for manufacturing turbine nozzle (e.g., turbine nozzle 100). Turning to FIG. 14, with reference to FIGS. 15-17, a flow diagram illustrating a method for manufacturing turbine nozzle 100 according to embodiments of the invention is provided. FIGS. 15-17 show a schematic cutaway perspective view of turbine nozzle 100 undergoing a method for manufacturing as illustrated by flow diagram of FIG. 14, according to embodiments of the invention. Returning to FIG. 14, one illustrative method according to various embodiments can include the following processes:

Process P100: providing turbine nozzle 100. As shown in FIG. 15, turbine nozzle 100 may include an airfoil 102; a cavity 118 located within airfoil 102, where the cavity 118 includes an inner surface; at least one endwall 104 adjacent airfoil 102; and a fillet region 106 connecting airfoil 102 and endwall 104, fillet region 106 including outer surface 110, as similarly discussed above. These components (e.g., airfoil 102, cavity 118, fillet region 106, etc.) of FIG. 15 may be substantially similar to those similarly numbered components as discussed above with reference to FIG. 1. As such, redundant explanation is omitted for clarity. As discussed above, turbine nozzle 100, including fillet region 106, may be created as a single component using any now known or later developed metal forming technique, e.g., casting, forging, milling, injection molding, etc. In alternative embodiments, also previously discussed, turbine nozzle 100 may be formed by coupling airfoil 102 to endwall 104 and forming fillet region 106 at the coupling interface between airfoil 102 and endwall 104. Airfoil 102 may be coupled to endwall 104 by any now known or later developed coupling techniques, e.g., welding, brazing, fastening, etc. In addition, fillet region 106 may be formed between airfoil 102 and endwall 104 by any now know or later develop forming technique, e.g., milling, casting, forging, etc.

Process P102 (e.g., following process P100) may include: forming an outlet 126 of non-linear cooling conduit on outer surface 110 of fillet region 106. More specifically, as shown in FIG. 16, forming the outlet 126 may be the beginning stages of forming non-linear cooling conduit 108 (P104) of turbine nozzle 100. Outlet 126 may be formed on outer surface 110 of fillet region 106 by any now known or later develop material removal technique, e.g., drilling, milling, grinding, electrical discharge machining (EDM), electrochemical machining (ECM), abrasive waterjet drilling, etc. More specifically, outlet 126 may be formed using a curved drilling technique, which may also be used to form non-linear cooling conduit 108 in turbine airfoil 100, as discussed below.

Process P104 (e.g., following process P102) may include: forming non-linear cooling conduit 108 within fillet region 106 and adjacent outer surface 110 of fillet region 106 of turbine nozzle 100. As shown in FIG. 17, non-linear cooling conduit 108 may be formed by beginning to remove material of the turbine nozzle 100 at outlet 126 using any now know or later developed material removal technique (e.g., drilling), as in process P102, and continuing to remove material of turbine nozzle 100 along an axial length (L) of airfoil 102 between airfoil 102 leading edge 113 and airfoil 102 trailing edge 114.

Forming non-linear cooling conduit 108 may further include performing a curved drilling process through a portion of outer surface 110 of fillet region 106. More specifically, in order to obtain the desired curvature in non-linear cooling conduit 108 of turbine nozzle 100, a curved drilling process, such as curved shaped-tube electrochemical machining (STEM), may be used. The curved drilling process may utilize a curved electrode for performing curved drilling of turbine nozzle 100. That is, a curved electrode may be provided having a curved configuration to form non-linear cooling conduit 108 within fillet region 106. The curved configuration of the curved electrode may be dependent, at least in part, on the axial length (L) of airfoil 102, the shape (e.g., arc profile) of airfoil 102, and/or the face (e.g., pressure face 115, suction face 116) of airfoil 102 in which non-liner cooling conduit 108 may be formed. In the curved drilling of non-linear cooling conduit 108, the curved electrode may disintegrate the material forming turbine nozzle 100. In contrast to conventional methods of drilling multiple perpendicular cooling holes in a nozzle, the curved drilling process according to various embodiments of the invention removes material from turbine nozzle 100 to form non-linear cooling conduit 108 with minimal stress or shredding of the material of turbine nozzle 100 at fillet region 106. It will also optimize proximity of the coolant channel to the hot surface and allow more accurate placement of the cooling for maximized coolant efficiency.

In an embodiment, as shown in FIG. 17, and as previously discussed, the forming of non-linear cooling conduit 108 may include forming non-linear cooling conduit 108 within fillet region 106 proximate pressure face 115 of airfoil 102. In an alternative embodiment, as previously shown in FIG. 3, the forming of non-linear cooling conduit 108 may include forming non-linear cooling conduit 108 within fillet region 106 proximate suction face 116 of airfoil 102. Turbine nozzle 100 may be modified around fillet region 106 during the casting process of turbine nozzle 100, by adding material post cast (such as by brazing on additional metal), to ensure sufficient material to allow drilling a continuous constant radius curved passage to form non-linear cooling conduit 108.

Process P106 (e.g., following process P104) may include: forming inlet 124 of non-linear cooling conduit 108 on inner surface 120 of cavity 118 of airfoil 102. More specifically, as shown in FIG. 17, inlet 124 may be formed when the curved electrode used during the curved drilling of non-linear cooling conduit 108 drills through fillet region 106 and through inner surface 120 of cooling fluid cavity 118. The forming of inlet 124 at P106 may allow non-linear cooling conduit 108 to be in fluid communication with cavity 118 of airfoil 102 via inlet 124 and outer surface 110 of fillet region 106 via outlet 126. As discussed above, this may allow cooling fluid to move from cavity 118 through non-linear cooling conduit 108 for continuously cooling fillet region 106 of turbine nozzle 100 during operation of a turbine system utilizing turbine nozzle 100 (e.g., FIGS. 12-13).

The processes (e.g., P100-P106) may also include forming at least one turbulators 134 within non-linear cooling conduit 108 after forming non-linear cooling conduit 108. More specifically, turbulators 134 may be formed on at least a portion of inner surface 136 of non-linear cooling conduit 108, as previously discussed with reference to FIG. 7. Also as previously discussed with reference to FIG. 7, turbulators 134 may be formed on at least a portion of inner surface 136 of non-linear cooling conduit 108 by any conventional technique now know or later developed.

Figure 18:
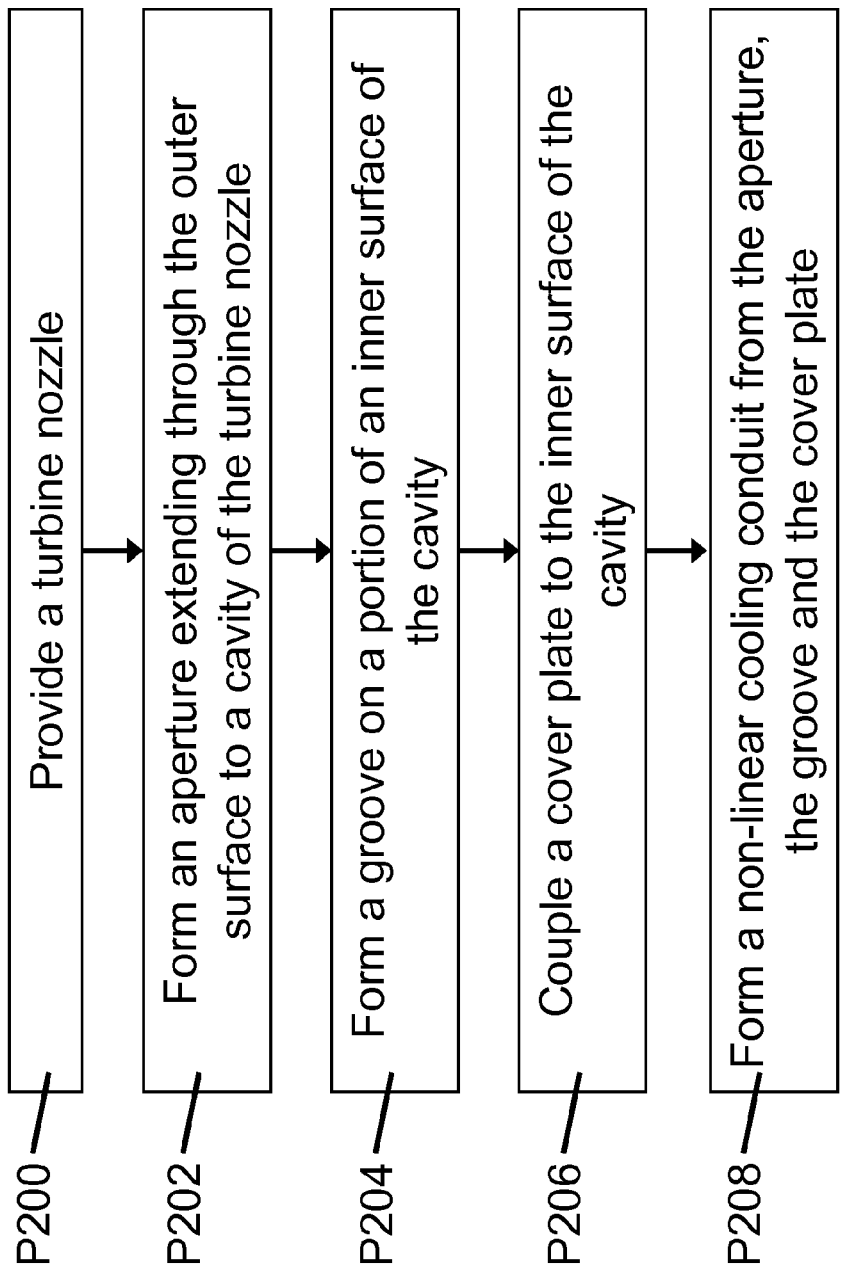
FIG. 18 shows a flow diagram illustrating an alternative method for manufacturing a turbine nozzle according to an alternative embodiment of the invention.
Figure 19:
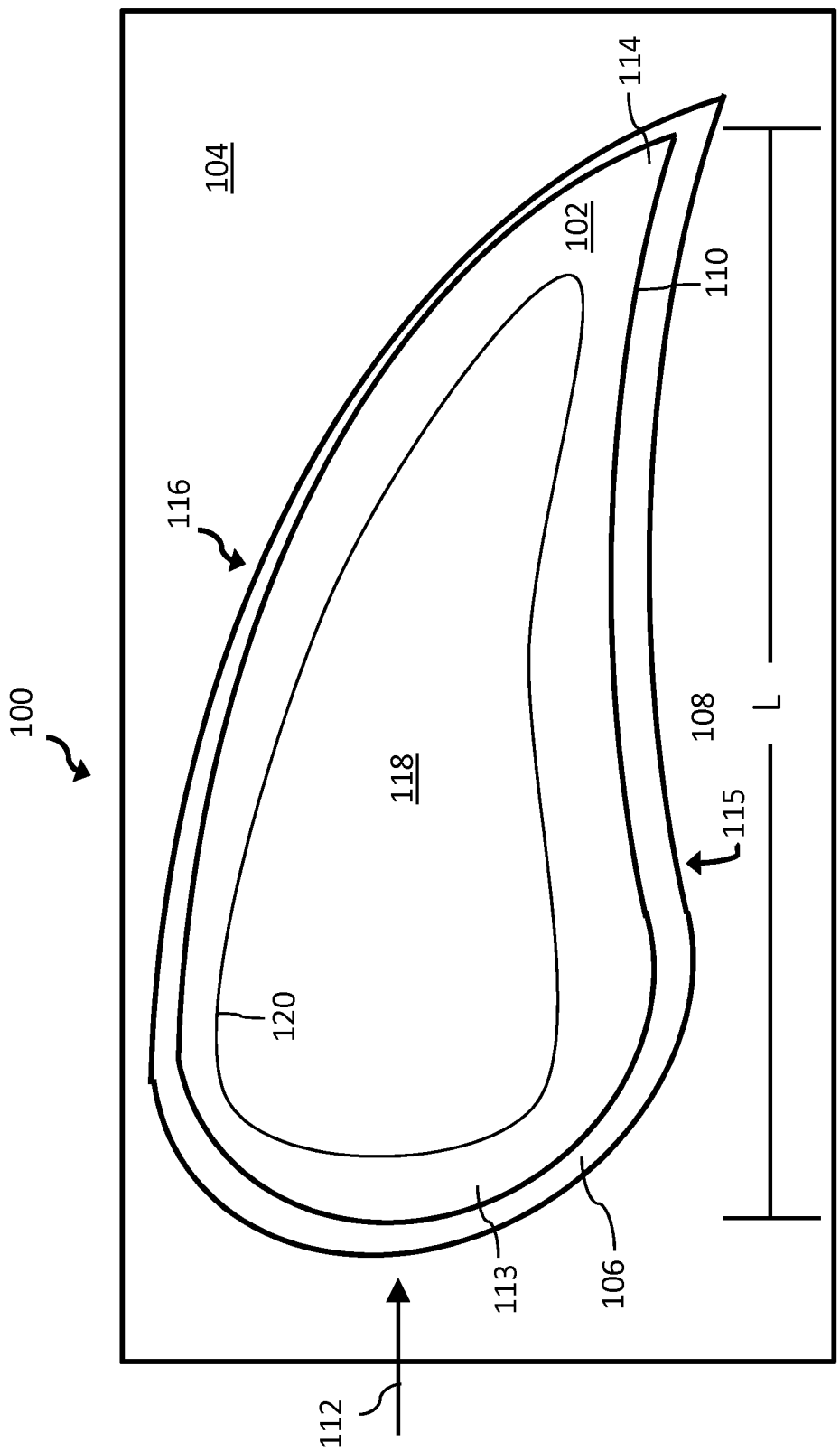
FIGS. 19-22 show a cross-sectional view of a turbine nozzle undergoing a method for manufacturing as illustrated by flow diagram of FIG. 18, according to an alternative embodiment of the invention.

Turning to FIG. 18, with reference to FIGS. 19-22, a flow diagram illustrating an alternative method for manufacturing turbine nozzle 100 according to an alternative embodiment of the invention is provided. FIGS. 19-22 show a cross-sectional view of turbine nozzle 100 undergoing a method for manufacturing as illustrated by flow diagram of FIG. 18, according to an alternative embodiment of the invention. Returning to FIG. 18, one illustrative method according to various embodiments can include the following processes:

Process P200: providing turbine nozzle 100. As shown in FIG. 19, turbine nozzle 100 may include airfoil 102; cooling fluid cavity 118 located within airfoil 102, cooling fluid cavity 118 including an inner surface; at least one endwall 104 adjacent airfoil 102; and fillet region 106 connecting airfoil 102 and endwall 104, fillet region including outer surface 110, as similarly discussed above. Additionally, as discussed above with respect to the processes for forming turbine nozzle 100 as shown in FIGS. 14-17, providing turbine nozzle 100 including fillet region 106 may include providing a single component turbine nozzle 100 or providing turbine nozzle 100 including separate portions (e.g., airfoil 102, endwall 104) coupled together. Redundant explanation of the providing process is omitted for clarity.

Figure 20:
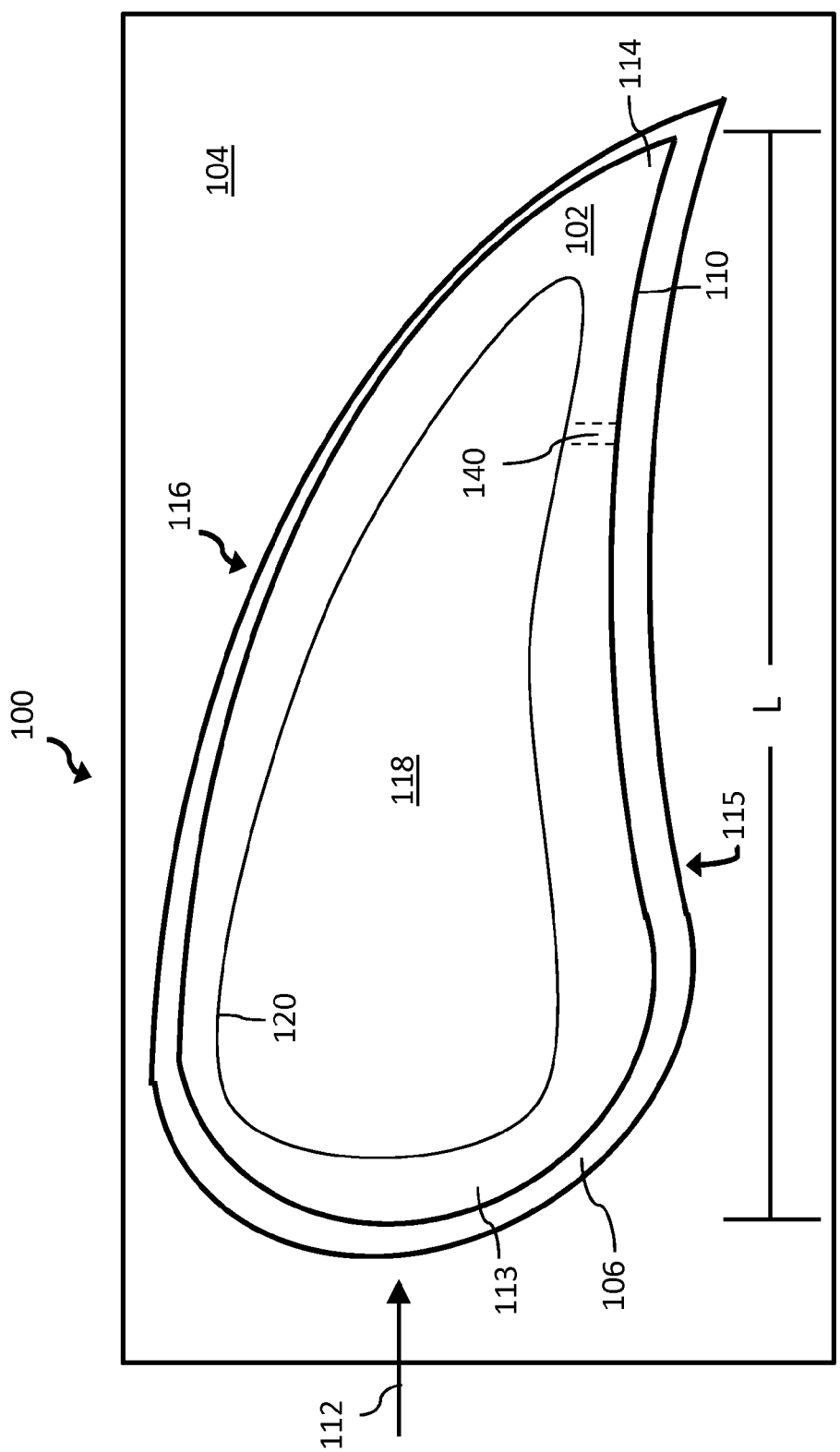

Process P202 (e.g., following process P200) may include: forming aperture 140 on fillet region 106 of turbine nozzle 100, aperture 140 extending through outer surface 110 of fillet region 106 to cooling fluid cavity 118 of airfoil 102. In an embodiment, as shown in FIG. 20, the forming of aperture 140 on fillet region 106 of turbine nozzle 100 may include forming aperture 140 through outer surface 110 of fillet region 106 and inner surface 120 of cooling fluid cavity 118 formed in airfoil 102. That is, aperture 140 may be formed substantially perpendicular to a face (e.g., pressure face 115) of turbine nozzle 100, and may allow cooling fluid cavity 118 to be temporarily in fluid communication with outer surface 110 of fillet region 106. Aperture 140 may be formed on fillet region 106 by any now know or later developed material removal technique, e.g., curved drilling, linear drilling, milled, punching, electrical discharge machining (EDM), electrochemical machining (ECM), abrasive waterjet drilling, etc. As previously discussed with reference to FIG. 9, aperture 140 may form outlet 126 (FIG. 22) of non-linear cooling conduit 108.

Figure 21:
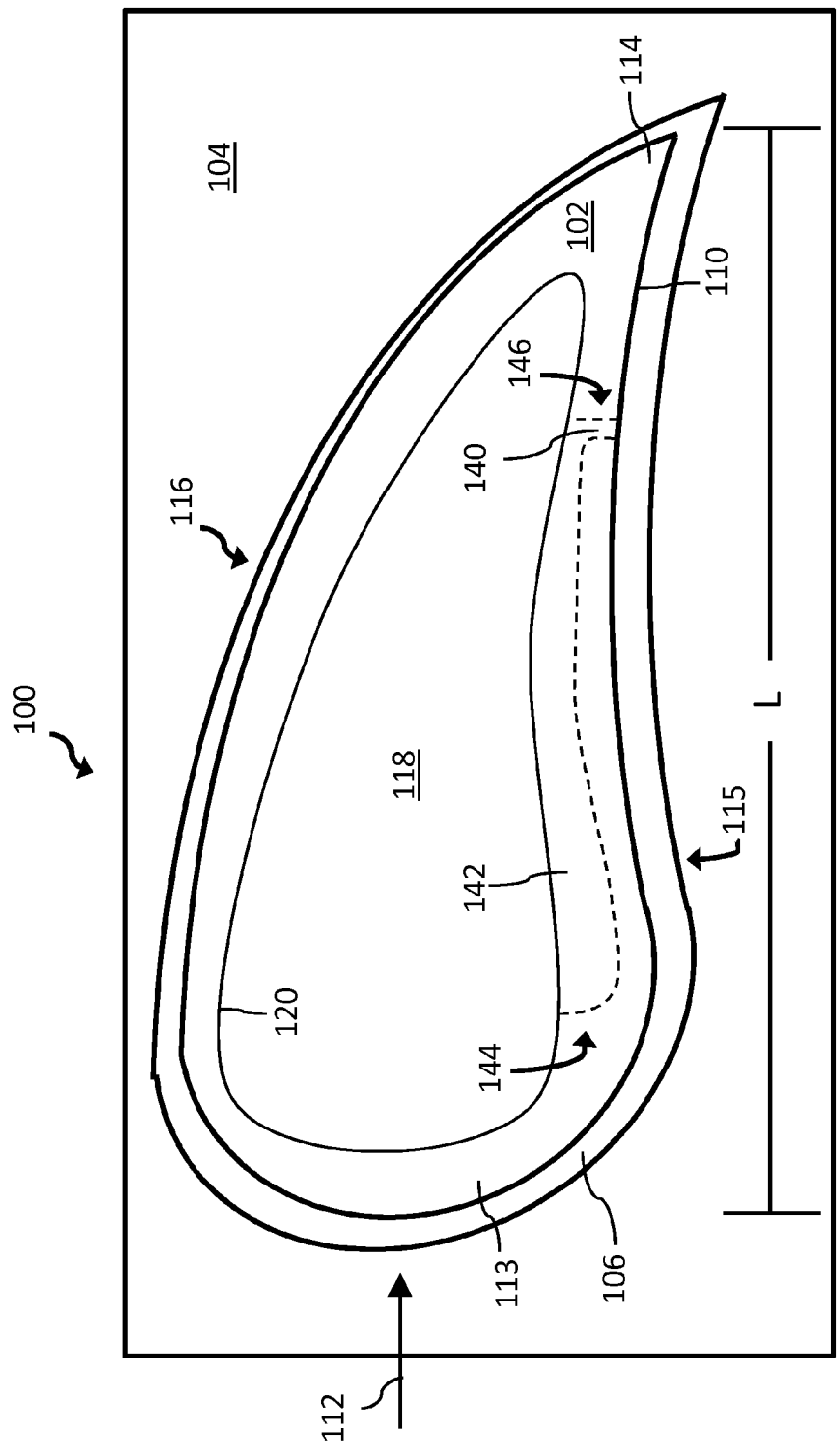

Process P204 (e.g., following process P202) may include: forming groove 142 on a portion of inner surface 120 of cooling fluid cavity 118. Groove 142 may be located substantially adjacent aperture 140. More specifically, as shown in FIG. 21, the forming of groove 142 on a portion of inner surface 120 of cooling fluid cavity 118 substantially adjacent aperture 140 may include beginning to form groove 142 at first end 144 and extending groove along the axial length (L) of airfoil 102 to a portion of aperture 140 at second end 146. The forming of groove 142 may include milling groove 142 on the portion of cooling fluid cavity 118. More specifically, the milling process may form groove 142 along the inner surface 120 of cooling fluid cavity 118 of turbine nozzle 100, such that groove 142 may be substantially non-linear. The milling process used in forming groove 142 may be any now known or later developed milling technique for milling groove 142 on a portion of cooling fluid cavity 118. In further alternative embodiments, groove 142 may be formed by any other now known or later developed material removal technique, e.g., forging, blasting, curved drilling, plunge EDM, milled EDM, ECM, etc.

Figure 22:
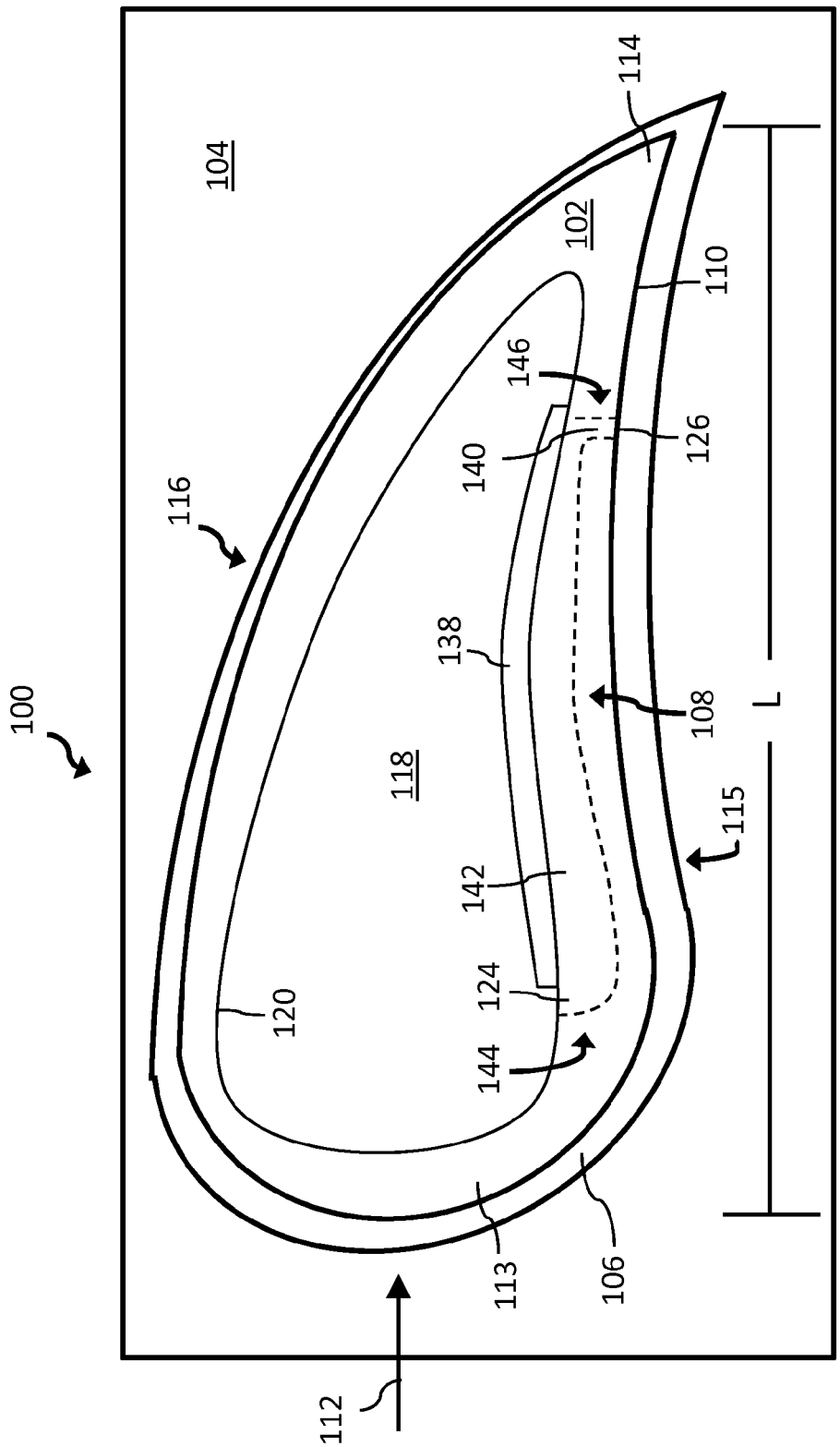

Process P206 (e.g., following process P204) may include: coupling cover plate 138 to inner surface 120 of cooling fluid cavity 118 of turbine nozzle 100. As shown in FIG. 22, cover plate 138 substantially covers aperture 140 and a portion of groove 142 on inner surface 120 of cooling fluid cavity 118. More specifically, as shown in FIG. 22, and as discussed above with respect to FIGS. 8 and 9, cover plate 138 may be coupled to inner surface 120 of turbine nozzle 100 by any now known or later developed coupling technique, e.g., fastening, welding, brazing, bolts, snap-fit, etc. As shown in FIG. 22, cover plate 138 may be coupled to inner surface 120 of cooling fluid cavity 118 and may substantially cover aperture 140, and a portion of groove 142 on inner surface 120. In not covering first end 144 of groove 142, cover plate 138 may form inlet 124 of non-linear cooling conduit 108. In an embodiment, as shown in FIG. 22, cover plate 138 may be substantially non-linear for forming non-linear cooling conduit 108. That is, in order to form the arc profile in non-linear cooling conduit 108, cover plate 138 may include an arc profile substantially similar to the arc profile of a respective face (e.g., pressure face 115) of airfoil 102, which may be an arc profile substantially similar to a portion of inner surface 120 of cooling fluid cavity 118.

Process P208 (e.g., following process P206) may include: forming non-linear cooling conduit 108 from aperture 140, groove 142 and cover plate 138. As shown in FIG. 22, non-linear cooling conduit 108 may be located between cooling fluid cavity 118 of airfoil 102 and outer surface 110 of fillet region 106. More specifically, as shown in FIG. 22, forming of non-linear cooling conduit 108 from aperture 140, groove 142 and cover plate 138, may occur after coupling cover plate 138 over aperture 140 and a portion of groove 142 at P206. That is, non-linear cooling conduit 108 may be formed at P208 after cover plate 138 is coupled to inner surface 120 of cooling fluid cavity 118 at P206. As shown in FIG. 22, non-linear cooling conduit 108, formed by the coupling of cover plate 138 to inner surface 120, may extend along the axial length (L) of a portion of airfoil 102 from inlet 124, formed by an uncovered portion of grove 142, to outlet 126, formed by covered aperture 140. In addition, the forming of non-linear cooling conduit 108 may include curved drilling through a portion of fillet region 106. In an embodiment, after cover plate 138 is coupled to fillet region 106, a curved or non-linear shape-tube electrochemical machining (STEM) or ECM process may be performed through fillet region 106, groove 142 and/or cover plate 138 in order to make non-linear cooling conduit 108 larger and/or to smooth and/or to turbulate the surface of non-linear cooling conduit 108 formed by groove 142 and cover plate 138.

Figure 23:
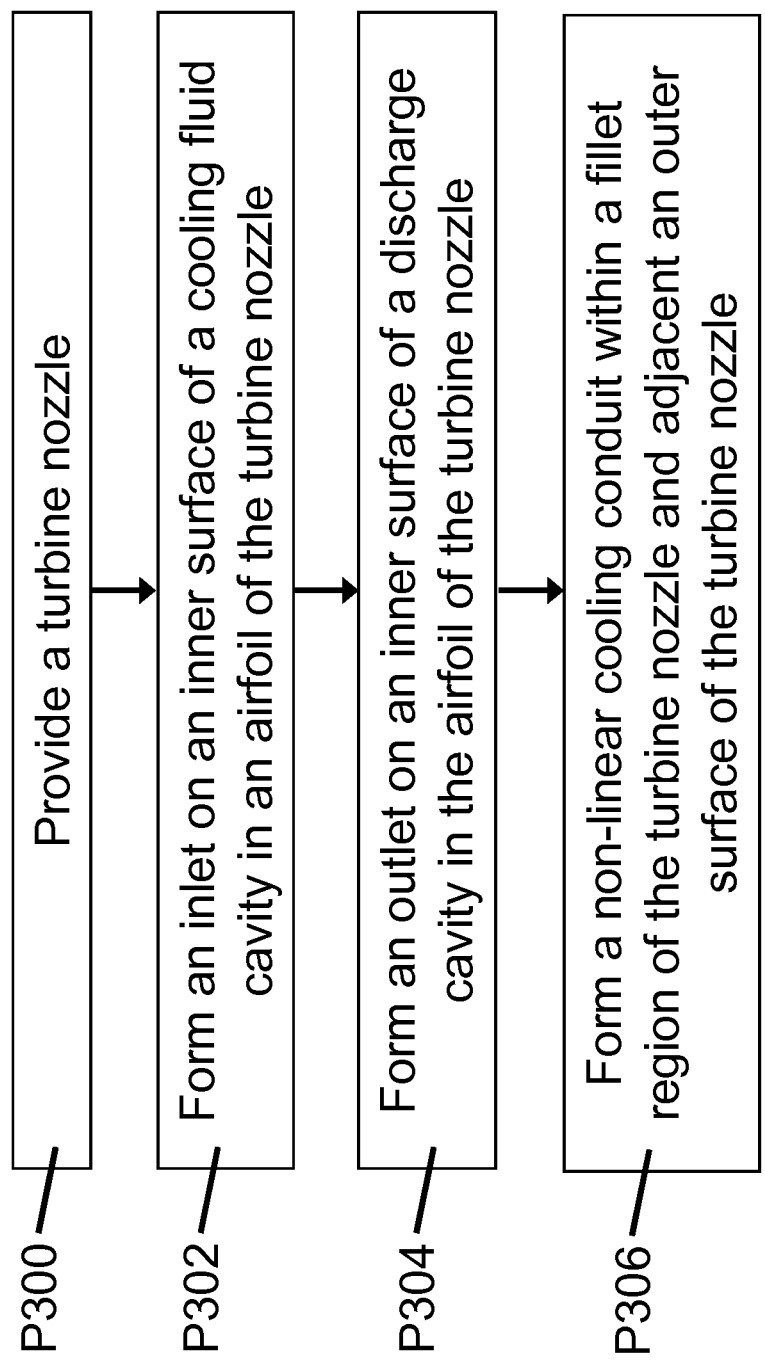
FIG. 23 shows a flow diagram illustrating an additional alternative method for manufacturing a turbine nozzle according to an additional alternative embodiment of the invention.
Figure 24:
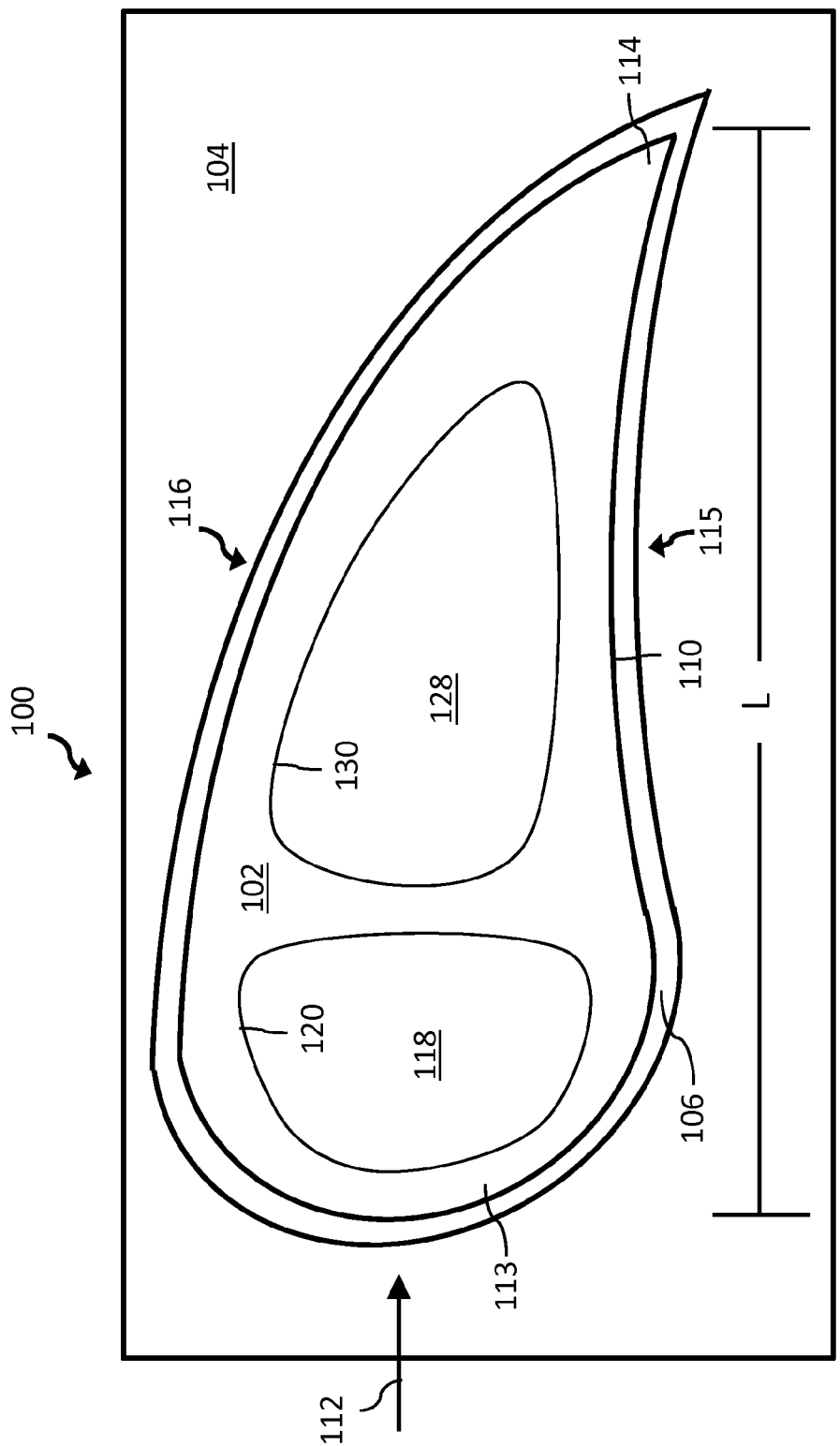
FIGS. 24-26 show a cross-sectional view of a turbine nozzle undergoing a method for manufacturing as illustrated by flow diagram of FIG. 23, according to an additional alternative embodiment of the invention.
Figure 25:
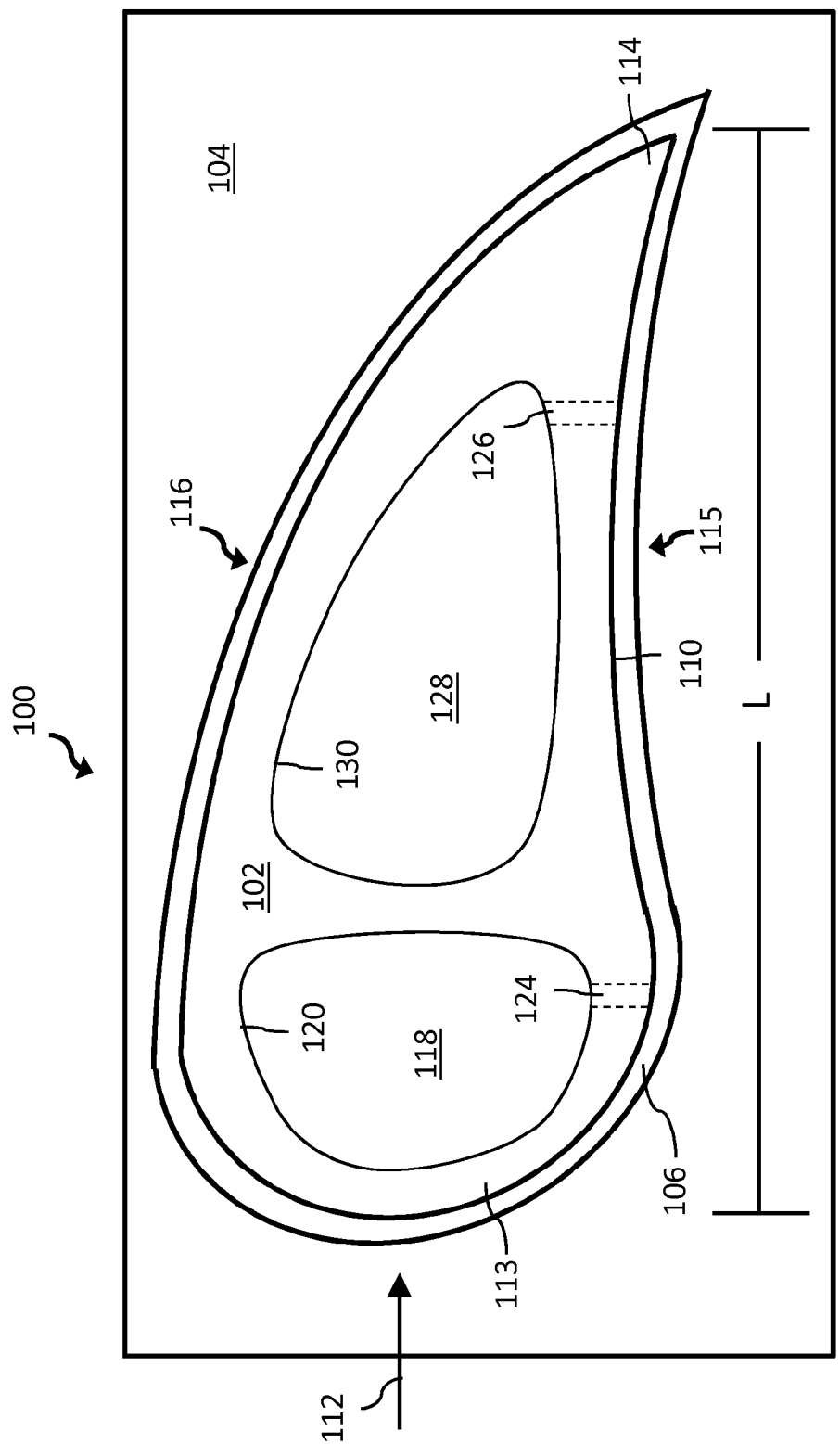
Figure 26:
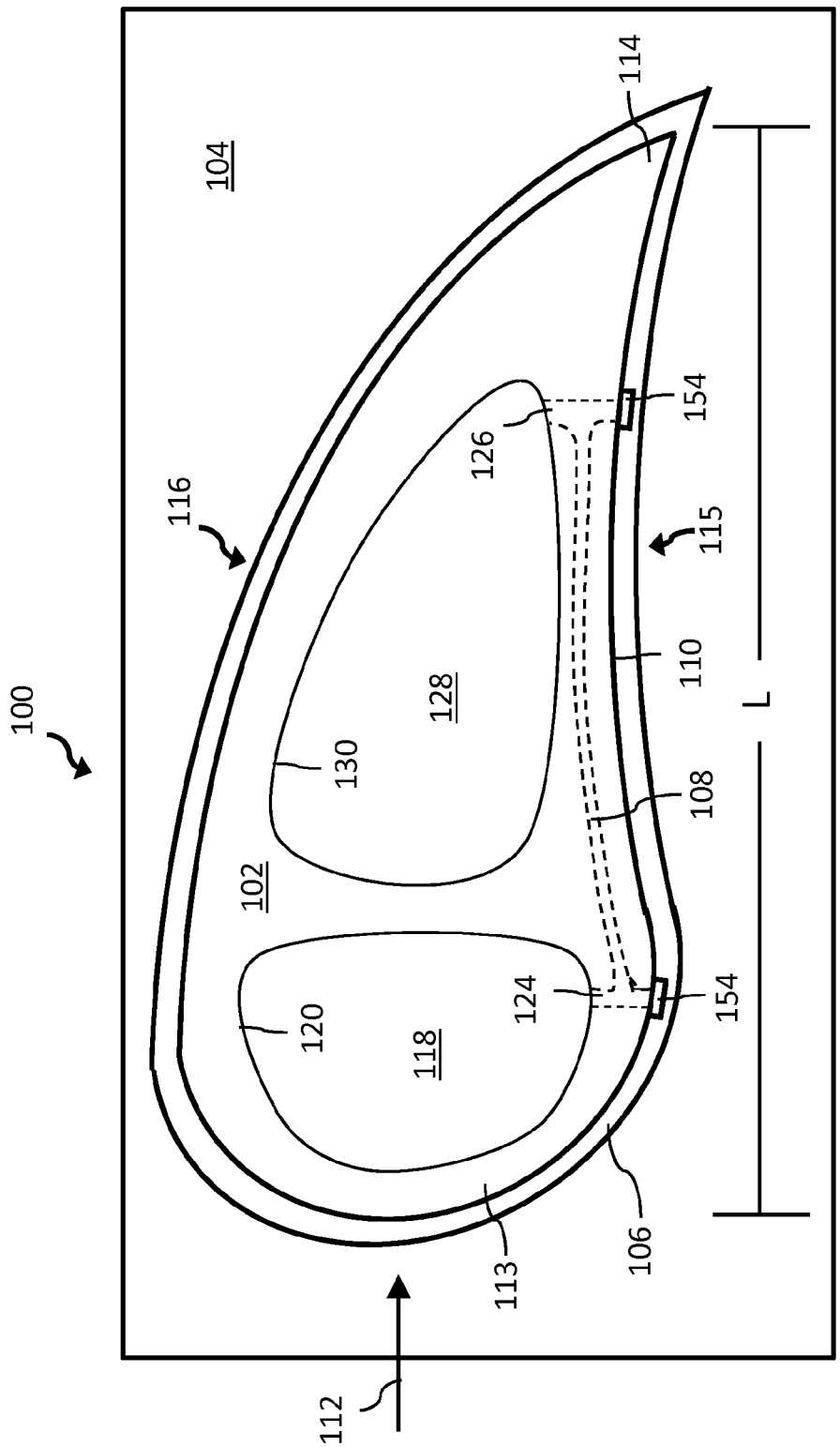

Turning to FIG. 23, with reference to FIGS. 24-26, a flow diagram illustrating an additional alternative method for manufacturing turbine nozzle 100 according to an additional alternative embodiment of the invention is provided. FIGS. 24-26 show a cross-sectional view of turbine nozzle 100 undergoing a method for manufacturing as illustrated by flow diagram of FIG. 23, according to an additional alternative embodiment of the invention. Returning to FIG. 23, one illustrative method according to various embodiments can include the following processes:

Process P300 providing turbine nozzle 100. In an embodiment, as shown in FIG. 24, turbine nozzle 100 may include airfoil 102, endwall 104 adjacent airfoil 102 and fillet region 106 connecting airfoil 102 and endwall 104, as discussed above. Also shown in FIG. 24, and as discussed with reference to FIGS. 5 and 6, turbine nozzle 100 may include cooling fluid cavity 118 within airfoil 102, including inner surface 120 and discharge cavity 128 within airfoil 102. Discharge cavity 128 may be adjacent cooling fluid cavity 118 and may include inner surface 130. Redundant explanation of the providing step is omitted for clarity.

Process P302 (e.g., following process P300) may include: forming inlet 124 of non-linear cooling conduit 108 on inner surface 120 of cooling fluid cavity 118 of airfoil 102. As shown in FIG. 25, inlet 124 may be formed by drilling through turbine nozzle 100. More specifically, as shown in FIG. 25, an electrode may perform a drilling process through outer surface 110 of fillet region 106 to cooling fluid cavity 118. Once the electrode is positioned in cooling fluid cavity 118, outlet 124 may be formed on inner surface 120 of cooling fluid cavity 118. In an alternative embodiment, inlet 124 may be formed by drilling through inner surface 120 of cooling fluid cavity 118 to outer surface 110 of fillet region 106 of turbine nozzle 100.

Process P304 (e.g., following process P302) may include: forming outlet 126 of non-linear cooling conduit 108 on inner surface 130 of discharge cavity 128. As shown in FIG. 25, outlet 126 may be formed by a similar process as inlet 124 in P302. More specifically, outlet 126 may be formed by drilling through outer surface 110 of fillet region 106 of turbine nozzle 100. An electrode may perform a drilling process through turbine nozzle 100 to discharge cavity 128. Once the electrode is positioned in discharge cavity 128, the electrode may be removed and outlet 126 may be formed on inner surface 130 of discharge cavity 128. In an alternative embodiment, outlet 126 may be formed by drilling through inner surface 130 of discharge cavity 128 to outer surface 110 of fillet region 106 of turbine nozzle 100.

Process P306 (e.g., following process P304) may include: forming non-linear cooling conduit 108 within fillet region 106 and adjacent outer surface 110 of fillet region 106 of turbine nozzle 100. As shown in FIG. 26, non-linear cooling conduit 108 may be in fluid communication with cooling fluid cavity 118 and discharge cavity 128 of turbine nozzle 100, as discussed in detail below. The forming of non-linear cooling conduit 108 may include curved drilling through the aperture formed by the electrode creating inlet 124 at P302. More specifically, a curved electrode may be inserted into the aperture formed in process P302 and may perform the curved drilling process, adjacent outer surface 110 of airfoil 102, to drill through airfoil 102 to intersect the aperture formed by the electrode that created discharge cavity 128 at P304. As shown in FIG. 26, and as previously discussed above, non-linear cooling conduit 108 may be formed along the axial length (L) of airfoil 102 between airfoil 102 leading edge 113 and airfoil 102 trailing edge 114. In an alternative embodiment, non-linear cooling conduit 108 may be formed within fillet region 106 by inserting a curved electrode in one of the inlet 124 formed on inner surface 120 of cooling fluid cavity 118, or outlet 126 formed on inner surface 130 of discharge cavity 128. Once the curved electrode is positioned in either the inlet 124 or outlet 126, the curved electrode may perform a curved drilling process through turbine airfoil 102 until it exits the respective opposite aperture (e.g., inlet 124, outlet 126).

After the curved drilling process is performed to form non-linear cooling conduit 108, the apertures created when forming inlet 124 at P302 and outlet 126 at P304, respectively, may be covered. More specifically, cover plates 154 may be mechanically coupled to outer surface 110 over the respective apertures formed in P302 and P304 by any now known or later developed mechanical coupling technique, e.g., fastening, brazing, welding, snap-fit, etc. After cover plates 154 are coupled to outer surface 110, non-linear cooling conduit 108 may be formed within fillet region 104, such that cooling fluid cavity 118 may be in fluid communication with discharge cavity 128. That is, cooling fluid may move from cooling fluid cavity 118 to discharge cavity 128 for cooling fillet region 106, and may not be discharged to outer surface 110 of fillet region 106.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method comprising:
   providing a turbine nozzle including:
      an airfoil having a leading edge and a trailing edge;
      at least one cavity located within the airfoil, the at least one cavity including an inner surface;
      at least one endwall adjacent the airfoil; and
      a fillet region connecting the airfoil and the at least one endwall, the fillet region including an outer surface;
   forming an aperture extending through the outer surface of the fillet region to the at least one cavity of the airfoil;
   forming a groove on a portion of the inner surface of the at least one cavity, such that the groove extends continuously along a majority of an axial length of the airfoil between the airfoil leading edge and the airfoil trailing edge;
   coupling a cover plate to the inner surface of the at least one cavity of the turbine nozzle to substantially cover a portion of the groove; and
   forming a non-linear cooling conduit from the aperture, the groove and the cover plate, the non-linear cooling conduit located between the cavity of the airfoil and the outer surface of the fillet region.

2. The method of claim 1, wherein the forming of the non-linear cooling conduit includes curved drilling through a portion of the groove and the cover plate.

3. The method of claim 1, wherein the forming of the groove includes at least one of:
   drilling the groove on the portion of the inner surface of the at least one cavity,
   milling the groove on the portion of the inner surface of the at least one cavity,
   electrical discharge machining (EDM) the groove on the portion of the inner surface of the at least one cavity, or
   electrochemical machining (ECM) the groove on the portion of the inner surface of the at least one cavity.

4. The method of claim 1, wherein the forming of the non-linear cooling conduit includes forming the non-linear cooling conduit proximate a pressure face of the airfoil.

5. The method of claim 1, wherein the forming of the non-linear cooling conduit includes forming the non-linear cooling conduit proximate a suction face of the airfoil.

6. The method of claim 1, wherein the cover plate includes an arc profile substantially similar to an arc profile of the airfoil.

7. The method of claim 1, further comprising:
   forming at least one turbulator on the groove after the forming of the non-linear cooling conduit within the fillet region.

8. The method of claim 1, wherein the forming of the non-linear cooling conduit further includes:

forming an inlet of the non-linear cooling conduit on the inner surface of the cavity by an uncovered portion of the groove on the fillet region; and forming an outlet of the non-linear cooling conduit on the outer surface of the fillet region by the aperture.

* * * * *